United States Patent
Chattopadhyay et al.

(10) Patent No.: US 6,998,051 B2
(45) Date of Patent: *Feb. 14, 2006

(54) PARTICLES FROM SUPERCRITICAL FLUID EXTRACTION OF EMULSION

(75) Inventors: Pratibhash Chattopadhyay, North Royalton, OH (US); Boris Y. Shekunov, Aurora, OH (US); Jeffrey S. Seitzinger, Broadview Heights, OH (US); Robert W. Huff, North Royalton, OH (US)

(73) Assignee: Ferro Corporation, Cleveland, OH (US)

(*) Notice: Subject to any disclaimer, the term of this patent is extended or adjusted under 35 U.S.C. 154(b) by 276 days.

This patent is subject to a terminal disclaimer.

(21) Appl. No.: 10/423,492

(22) Filed: Apr. 25, 2003

(65) Prior Publication Data
US 2004/0026319 A1 Feb. 12, 2004

Related U.S. Application Data

(60) Provisional application No. 60/393,904, filed on Jul. 3, 2002, provisional application No. 60/445,944, filed on Feb. 7, 2003.

(51) Int. Cl.
*B01D 11/00* (2006.01)
*B29B 9/00* (2006.01)
*A61K 9/14* (2006.01)

(52) U.S. Cl. ............... 210/634; 210/639; 264/5; 264/11; 424/489; 424/501; 518/135

(58) Field of Classification Search ............ 210/259, 210/511, 634, 639, 708, 806; 422/256, 257; 426/655; 424/489–502; 516/53, 54, 135; 264/5, 11, 12
See application file for complete search history.

(56) References Cited

U.S. PATENT DOCUMENTS

| | | | |
|---|---|---|---|
| 4,177,177 A | 12/1979 | Vanderhoff et al. |
| 4,734,451 A | 3/1988 | Smith |
| 4,744,926 A | 5/1988 | Rice |
| 4,898,673 A | 2/1990 | Rice et al. |
| 5,158,704 A | 10/1992 | Fulton et al. |
| 5,169,968 A | 12/1992 | Rice |
| 5,189,107 A | 2/1993 | Kasai et al. |
| 5,216,065 A | 6/1993 | Colyer et al. |

(Continued)

FOREIGN PATENT DOCUMENTS

JP 01-158042 6/1989

OTHER PUBLICATIONS

Sjostrom, Brita and Bergenstahl, Bjorn. Preparation of submicron drug particles in lecithin-stabilized o/w emulsions; I. Model studies of the precipitation of cholesteryl acetate, International Journal of Pharmaceutics. 88, 53-62 (1992). Elsevier Science Publishers B V.

(Continued)

Primary Examiner—Joseph Drodge
(74) Attorney, Agent, or Firm—Rankin, Hill, Porter & Clark LLP

(57) ABSTRACT

A method of producing microparticles and nanoparticles of a solute via the extraction of solvent, having the solute dissolved therein, from an emulsion using a supercritical fluid. The solute to be precipitated is dissolved in the solvent to form a solution, and the solution is dispersed in an immiscible or partially miscible liquid to form an emulsion. The particles are produced via the extraction of the solvent from the emulsion using the supercritical fluid. The process can produce an aqueous suspension of particles that are substantially insoluble in water, and the solvents used in the process to form the emulsion initially can be recovered and recycled.

20 Claims, 19 Drawing Sheets

U.S. PATENT DOCUMENTS

| | | | |
|---|---|---|---|
| 5,244,768 A | 9/1993 | Inaba | |
| 5,266,205 A | 11/1993 | Fulton et al. | |
| 5,290,959 A | 3/1994 | Rice | |
| 5,296,166 A | 3/1994 | Leong | |
| 5,578,650 A | 11/1996 | Delgado et al. | |
| 5,614,089 A | 3/1997 | Allington et al. | |
| 5,622,649 A | 4/1997 | Hunter et al. | |
| 5,639,441 A | 6/1997 | Sievers et al. | |
| 5,750,679 A | 5/1998 | Haas et al. | |
| 5,776,486 A | 7/1998 | Castor et al. | |
| 5,789,505 A | 8/1998 | Wilkinson et al. | |
| 5,827,522 A | 10/1998 | Nowack | |
| 5,851,453 A * | 12/1998 | Hanna et al. | 264/5 |
| 5,863,696 A | 1/1999 | Koyama et al. | |
| 5,921,478 A | 7/1999 | Kamiwano et al. | |
| 5,981,474 A * | 11/1999 | Manning et al. | 514/2 |
| 6,095,134 A | 8/2000 | Sievers et al. | |
| 6,106,720 A | 8/2000 | Kanel et al. | |
| 6,228,399 B1 | 5/2001 | Parikh et al. | |
| 6,235,701 B1 | 5/2001 | Senger Elsbernd | |
| 6,291,013 B1 | 9/2001 | Gibson et al. | |
| 6,299,906 B1 | 10/2001 | Bausch et al. | |
| 6,372,260 B1 | 4/2002 | Andersson et al. | 424/501 |
| 6,380,302 B1 | 4/2002 | Ikenaga et al. | |
| 6,384,090 B1 | 5/2002 | Riede et al. | |
| 6,391,452 B1 | 5/2002 | Antonsen et al. | |
| 6,414,050 B1 | 7/2002 | Howdle et al. | |
| 6,440,431 B1 | 8/2002 | Yoshida et al. | |
| 6,440,493 B1 | 8/2002 | Gibson et al. | |
| 6,540,393 B1 | 4/2003 | Lyons et al. | |
| 2004/0091546 A1 * | 5/2004 | Johnson et al. | 424/501 |

OTHER PUBLICATIONS

Sjostrom, Brita and Bergenstahl, Bjorn. Preparation of submicron drug particles in lecithin-stabilized o/w emulsions; I. Model studies of the precipitation of cholesteryl acetate, International Journal of Pharmaceutics. 84, 107-116 (1992). Elsevier Science Publishers B V.

Yoshinobu, Kawano; Shiomori, Koichiro; Kiyoyama, Shiro; Takeshita, Koichiro; and Hatate, Yasuo. Characteristics of Biodegradable Microcapsules by Solvent Evaporation in (W/O/W) Emulsion System Journal of Chemical Engineeiring of Japan. vol. 34.

Nakajima, Akira; Hashimoto, Kazuhito; and Watanabe, Toshiya. Recent Studies on Super-Hydrophobic Films, Monatshefte fur Chemie 132, 31-41 (2001). Austria.

Chung, Tze-Wen; Huang, Yi-You; and Liu Yi-Ze. Effects of the rate of solvent evaporation on the characteristics of drug loaded PLLA and PDLLA microspheres, International Journal of Pharmaceutics. 212, 161-169 (2001).

* cited by examiner

US 6,998,051 B2

PARTICLES FROM SUPERCRITICAL FLUID EXTRACTION OF EMULSION

REFERENCE TO RELATED APPLICATIONS

This application claims priority to provisional patent Application Ser. No. 60/393,904, filed Jul. 3, 2002, and to provisional patent Application Ser. No. 60/445,944 filed Feb. 7, 2003, the disclosures of which are hereby incorporated by reference in their entirety.

BACKGROUND

1. Field of Invention

The present invention relates generally to a method of producing particles via solvent extraction using a supercritical fluid, wherein a solute is dissolved in a solvent to form a solution, and the solution is dispersed in an immiscible or partially miscible liquid to form an emulsion, and the solvent is extracted from the emulsion.

2. Description of Related Art

Particles are conventionally produced by forming a solution of desired material in an organic solvent, which is then emulsified with large quantities of water. The desired material is then precipitated from the emulsion in the form of fine particles either by evaporation of the solvent or by extraction using another organic solvent. Removal of the organic solvent from the micelles of the emulsion leads to supersaturation, which in turn results in the precipitation of the desired material as fine particles.

This process has several drawbacks. First, the process proceeds at an extremely slow rate, exceeding several hours in most instances. Ensuring low residual solvent levels requires undesirably long evaporation times. Second, organic solvent extraction processes are difficult to scale up and require the use of a large amount of solvent, which results in a large waste stream. Furthermore, concerns have been raised in recent years about possible environmental and health affects arising from the use of certain solvents which are difficult to remove completely and are sometimes retained as a residual material in the final product.

SUMMARY OF THE INVENTION

The present invention provides an apparatus and a method of producing particles of solute via supercritical fluid extraction of solvent from emulsion droplets, where the emulsion droplets contain a solution of the solvent and a solute that is dissolved in the solvent. The solution is dispersed in a generally immiscible liquid to form the emulsion. In a preferred embodiment of the invention, the process produces an aqueous colloidal suspension of particles that are substantially insoluble in water via the extraction of a water immiscible or partially miscible solvent from the micelles of an emulsion using a supercritical fluid such as carbon dioxide. Solvent used in a process according to the invention to form the emulsion droplets can be recovered and recycled.

The foregoing and other features of the invention are hereinafter more fully described in the following description, which also sets forth in detail certain illustrative embodiments of the invention, these being indicative, however, of but a few of the various ways in which the principles of the present invention may be employed.

DETAILED DESCRIPTION OF THE INVENTION

The present invention provides a method of producing Particles from Supercritical Fluids Extraction of Emulsions ("PSFEE"). To form the particles, a solute is dissolved in a suitable solvent to form a solution. The solution is then dispersed into an immiscible fluid to form an emulsion; the solute is not soluble in the immiscible fluid. The emulsion thus includes a discontinuous phase containing the solute (in solution) and a continuous phase. The solvent is extracted from the discontinuous phase, and the solute precipitates into the fluid to form a particle suspension in the continuous phase (i.e., the immiscible fluid).

Figure 1:
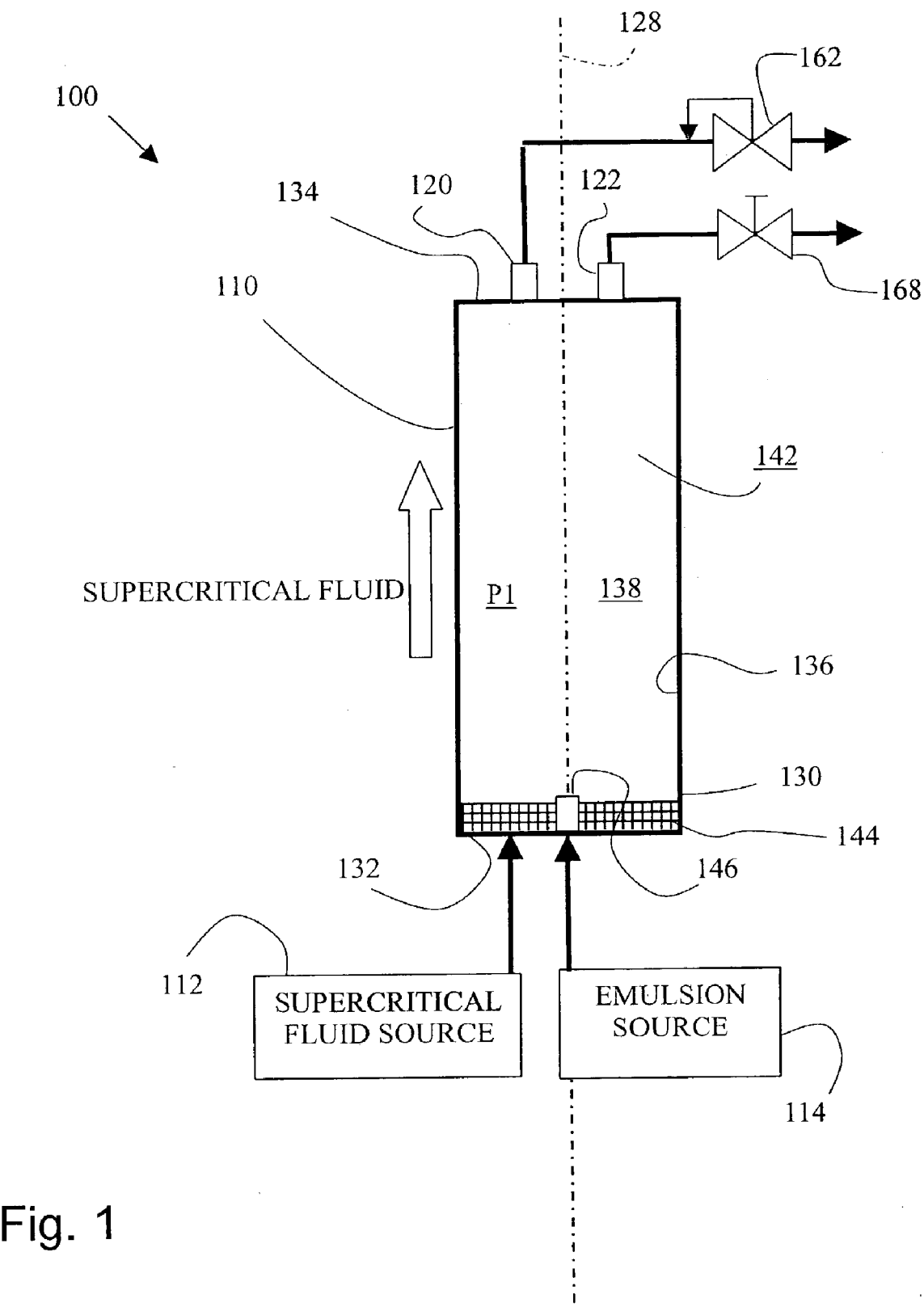
FIG. 1 is a schematic diagram of an apparatus used in a method according to the invention.

With reference to FIG. 1, an apparatus 100 for use with a method according to the invention is shown. The apparatus 100 includes a vessel 110, a supercritical fluid source 112, an emulsion source 114, and first and second outlets 120, 122. The vessel 110 is preferably cylindrical defining an axis 128, and has sidewalls 130 and first and second ends 132, 134. The axis 128 is preferably vertical and the ends 132, 134 are oriented such that the first end 132 is DOWN, and the second end 134 is UP, relative to each other. The sidewalls 130 and ends 132, 134 have a continuous inner surface 136 that defines an extraction chamber 138.

A frit 144, preferably stainless steel and having a pore size of less than 0.5 micrometers or microns, is disposed within the chamber 138 and overlays the inner surface at the first end 132. The supercritical fluid source 112 communicates with the chamber 138 through the frit 144, and supplies supercritical fluid therethrough. The frit 144 allows the supercritical fluid to be bubbled through the emulsion in the form of fine droplets thereby maximizing the contact between the supercritical fluid and the emulsion.

The emulsion source 114 communicates with the chamber 138 through an inlet 146. In alternative embodiments, an inlet including a nozzle communicates through the sidewall 130. The nozzle preferably has one or a plurality of small diameter apertures. The nozzle sprays the emulsion into a headspace 142 to form relatively smaller emulsion droplets compared to mere pumping of an emulsion stream through the inlet 146. Alternatively, a packed bed can be disposed within the extraction chamber 138, preferably adjacent to the first end 132 so as to overlay. If present, the packed bed enhances mixing between the emulsion and the supercritical fluid. The chamber 138 has a free volume or headspace 142 that is substantially unobstructed.

A backpressure regulator 162 communicates with the first outlet 120, and a release valve 168 communicates with the second outlet 122. The backpressure regulator 162 is preferably a 26-1700 type regulator, which is commercially available from Tescom, USA (Elk River, Minn.). The backpressure regulator 162 controls a rate of flow of solvent laden supercritical fluid from leaving the extraction chamber 138, and thereby maintains a pressure P1 in the extraction chamber 138 in a predetermined range of pressures. The release valve 168 is used for safety, and is a standard commercially available valve and is interchangeable with other commercially available valves.

The solute is preferably a substance that is insoluble or slightly soluble in water. Thus, the method is particularly suitable for producing many pharmaceutical compositions, as many of which are either insoluble, or slightly soluble, in water and are delivered to patients as aqueous colloidal suspensions. It is estimated that approximately 40% of all pharmaceutical compositions available in the marketplace are insoluble or slightly soluble in water, and are thus particularly suited for production by a method in accordance with of the present invention. Alternatively, concentrated wet particles can be obtained by passing the colloidal suspensions through a high pressure filter communicating with the extraction chamber 138. The concentrated wet particles can then be dried by freeze-drying or vacuum-drying techniques to obtain dry powder.

The invention is not limited to use with pharmaceuticals, however, and has useful application to other industries. Accordingly, suitable alternative solutes include, for example, biologically active materials, medicinal agents, nutritional materials, proteins, peptides, alkaloids, alkyloids, animal and/or plant extracts, antigens, nucleic acids, antibiotics, vitamins, lipids, polymers, polymer precursors, pigments, toxins, insecticides, viral materials, diagnostic aids, agricultural chemicals, dyes, explosives, paints, cosmetics, enzymes, and catalysts.

The supercritical fluid-soluble liquid or solvent forming the discontinuous phase is preferably an organic solvent or an oil, and thus is either immiscible or only partially miscible with water. Suitable preferred organic solvents that are immiscible in water include, for example, toluene, cyclohexane, and higher alkanes. Organic solvents that are partially miscible in water include, for example, ethyl acetate, propyl acetate, and 2-butanone.

The supercritical fluid-insoluble liquid forming the continuous phase is preferably water. It is naturally understood that water-soluble, water and aqueous are terms that are exemplary of polar solvent fluids, just as water-insoluble, organic solvent, oil and the like are terms that are exemplary of non-polar solvent fluids. Therefore, a polar fluid and a non-polar fluid may be substituted for water or water-soluble and oil for water-insoluble, respectively, in accordance with the present invention.

Preferably and as discussed hereinabove, a surfactant is used to form a stable emulsion. The surfactant used in the invention is not critical, and any of the conventional surfactants used to form oil-in-water (o/w), oil-in-oil (o/o), water-in-oil (w/o) or multiple phase (e.g., w/o/w, etc.) micro-emulsions and macro-emulsions can be used. A particularly suitable surfactant is Polyoxyethylene Sorbitan Monooleate, such as TWEEN-80, which is commercially available from ICI Americas, Inc. (Bridgewater, N.J.). Preferably, the surfactant used in the invention will have an HLB suitable for preparing a stable emulsion.

The size of the emulsion micelles can depend upon the agitation speed or the degree of homogenization of the emulsifier and the concentration of the surfactant or solvent or the solute. Generally, a higher degree of homogenization, higher concentrations of surfactants, and lower solute and solvent concentrations tend to produce smaller micelles. The emulsifier is preferably a dispersator, ultrasonic horn, microfluidizer, static mixer, colloid mill, fluid energy mill, turbine mixer, or a spontaneous emulsification technique.

Preferably, a surfactant is employed to form a thermodynamic equilibrium between the solvent in the emulsion droplets and a suspending aqueous phase. Supercritical fluid extracts the solvent from the emulsion droplets resulting in precipitation of the solute in the form of fine particles. Particles are formed due to supersaturation as the supercritical fluid extracts the solvent from the emulsion. The surfactant present in the emulsion stabilizes the particles soon after formation thus preventing particle growth due to agglomeration.

In a preferred embodiment of the invention, the emulsion includes a water insoluble solute, for example, a drug. The solute is dissolved in a water-insoluble, or partially soluble, organic solvent. The drug bearing organic solvent solution is then emulsified into an aqueous medium along with one or more stabilizers or surfactants. The stabilizers can be added to the organic solvent phase, or alternatively to the aqueous phase or to both phases, so as to increase the stability of the emulsion. It is preferred that the emulsions are stable during processing to increase the uniformity of the particles formed by the process. However, precipitation of particles can be achieved using either stable or unstable emulsions. The use of surfactants is therefore optional and serves to provide stability to and increase particle uniformity. The surfactant can also be utilized to inhibit agglomeration between particles during particle formation, after particle formation, or both during and after.

The supercritical fluid is preferably supercritical carbon dioxide ("$CO_2$"). However, suitable alternative preferable supercritical fluids include water, trifluoro methane, nitrous oxide, dimethylether, straight chain or branched C1–C6-alkanes, alkenes, alcohols, and combinations thereof. Preferable alkanes and alcohols include ethane, ethanol, propane, propanol, butane, butanol, isopropane, isopropanol, and the like. In alternative embodiments of the present invention, supercritical fluid includes materials in near supercritical states, for example, compressed or liquefied gas.

During operation, the emulsion is loaded into the extraction chamber 138. Supercritical fluid is bubbled into the extraction chamber to contact the emulsion. The supercritical fluid strips or dissolves the solvent from the emulsion micelles/droplets. The removal of the solvent from the micelles causes supersaturation and precipitates the solute into the continuous phase, e.g. water. The solvent and a supercritical fluid are separated and recovered from the overhead product, with the solute being entrained or suspended in the aqueous phase as discrete solids. The aqueous suspension of solute particles in water can be collected by depressurizing the extraction chamber after the removal of the solvent from the emulsion.

In another preferred embodiment, the emulsion is sprayed into the extraction chamber using a capillary nozzle to form emulsion droplets in the headspace. In alternative embodiments, the nozzle used in the spraying process is a coaxial nozzle or an ultrasonic nozzle, or a commercially known equivalent thereof. Supercritical fluid is introduced into the extraction chamber to contact the emulsion droplets. A vibrating surface or mixer (e.g., a propeller-type mixer) can be placed in the extraction chamber, and operated to enhance or increase the contact area between the emulsion and supercritical fluid.

During operation, the supercritical fluid strips or dissolves the solvent from the droplets. The removal of the solvent from the droplets causes supersaturation of the solute in the solvent, and as a result, the solute precipitates into the continuous phase. Each emulsion droplet can yield one or more particles. The number of particles per emulsion droplet can be controlled by controlling such parameters as droplet size, emulsion concentration and solute concentration, as well as the selection of operating conditions and type of solvent, solute and supercritical fluid.

Preferably, the solvent and supercritical fluid are separated and recovered from the overhead product, while the solute is entrained or suspended in the continuous or aqueous phase as discrete solid particles. Residual solvent that is dissolved in the supercritical fluid may be removed from the chamber by purging with clean $CO_2$. Once the residual solvent is removed, the chamber is depressurized so that the aqueous suspension of particles can be collected.

It is believed that, mass transfer between the solvent phase in the droplets and the supercritical phase causes supersaturation of the solute in the solvent. The supersaturation leads to the precipitation of the solute in the form of fine particles into the continuous phase. The rate of transfer between the organic phase and the supercritical phase can be selected so that the transfer is extremely rapid. In cases when the emulsion is injected into the supercritical fluid, the mass transfer rate is enhanced due to the motion of the tiny droplets within the supercritical fluid medium. In addition, surfactant molecules can be added to prevent particle growth after precipitation by stabilizing the tiny nuclei formed. The particles obtained using such a process are typically in the nanometer to low micrometer average diameter range.

Particles having a high purity are obtained by filtering the aqueous suspensions using ultra filtration or high-speed centrifugation. This alternative embodiment of the invention can be used for the precipitation of a wide variety of materials that are substantially insoluble in the continuous phase, for example water.

In an alternative preferred embodiment, the emulsion is prepared using a solution containing a partially water-soluble solvent and water. The solvent is saturated with water, and the water is saturated with the solvent. A thermodynamic equilibrium is formed between the solvent in the emulsion droplets and a suspending aqueous phase. Apart from acting as an anti-solvent, supercritical fluid extracts the solvent dissolved in the aqueous phase. The extraction disturbs the thermodynamic equilibrium between the organic solvent in the droplets and the aqueous phase, resulting in rapid mass transfer of the organic solvent from the droplets and into the aqueous phase. Particles are formed due to supersaturation as the supercritical fluid extracts the solvent from the emulsion.

The rate of solvent extraction can affect the size of the particle formed. Generally, the faster the extraction rate, the smaller the particles are that are formed. Supercritical $CO_2$ extraction has a relatively faster extraction rate compared to extraction rates of other conventional techniques, and thus adds to the formation of relatively smaller particles. The diameters of particles obtained by a method according to the invention are typically in the nanometer range, or the single digit micron range, with a narrow particle size distribution. In particular, particles are produced having a size in a range of 0.1 nanometers to 1.0 millimeter. More particularly, particles are produced having a size in a range of 0.1 micrometers to 400 micrometers, and most preferably in a range of 1 nanometer to 500 nanometers. Accordingly, selecting parameters such as solvent, solute and supercritical fluid type as well as other process parameters can determine particles size.

The current invention is particularly suited to producing nano or micro particles of a solute that is substantially insoluble in water and that is capable of dissolving in a suitable organic solvent that is generally immiscible with water. Such particles are useful in different industries, for example, in the pharmaceutical industry for drug particle processing and comminution, drug encapsulation, and preparation of formulations; in the paint industry for preparing nanoparticles of pigments and also for coating of pigments; and in the electronic industry for preparing nanoparticles of inorganic or organic materials.

Methods according to the invention can be practiced as a batch process or as a continuous process. In the continuous process, the resulting liquid suspension of solid particles is removed from the extraction chamber at about the same rate as the emulsion is fed into the extraction chamber. The solvent bearing supercritical fluid is removed from the extraction chamber at about the same rate as the supercritical fluid is fed into the extraction chamber. The pressure in the extraction chamber is preferably maintained at about a constant pressure value, or in a narrow range of pressure values.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Sigma Aldrich, Inc. (St. Louis, Mo.) and/or Fisher Scientific International, Inc. (Hanover Park, Ill.).

Example 1

Example 1(a)

Production of Polystyrene Particles by a Method According to the Invention Using a Water Insoluble Organic Solvent Preparation of Polystyrene (PS) Emulsion:
Initially, 0.25 grams of polystyrene (PS) and 0.2 grams of SPAN-80 (surfactant) were dissolved into 20 grams of toluene to form a solution. This solution was then added to 200 grams of water containing 0.3 grams of TWEEN-80 (surfactant) to form a mixture. The mixture was emulsified using a dispersator for 10 minutes at 6000 rpm to form EMULSION 1(a).

Production of PS Particles:

In EXAMPLE 1(a), a 4.0 ml aliquot of EMULSION 1(a) was loaded into an extraction chamber having a volume of 10 ml. Glass wool and beads were packed inside the dead volume of the extraction chamber to prevent liquid entrainment during extraction, and to minimize the re-precipitation of residual toluene during depressurization. Supercritical $CO_2$ was then bubbled into the extraction chamber through a 0.5 $\mu$m stainless steel frit at the bottom of the extraction chamber. The extraction chamber was maintained at a pressure of 80 bar and a temperature of 45 degrees Celsius (° C.) and a flow rate at 0.7 milliliters per minute (ml/min) of $CO_2$. The amount of toluene extracted from the chamber was measured using a photo diode array UV/VIS detector. Almost all of the toluene was extracted out of EMULSION 1(a) in 90 minutes (residual toluene was determined to be 20 parts per million (ppm)). The extraction chamber was depressurized and an aqueous colloidal suspension of particles was obtained.

Figure 2:
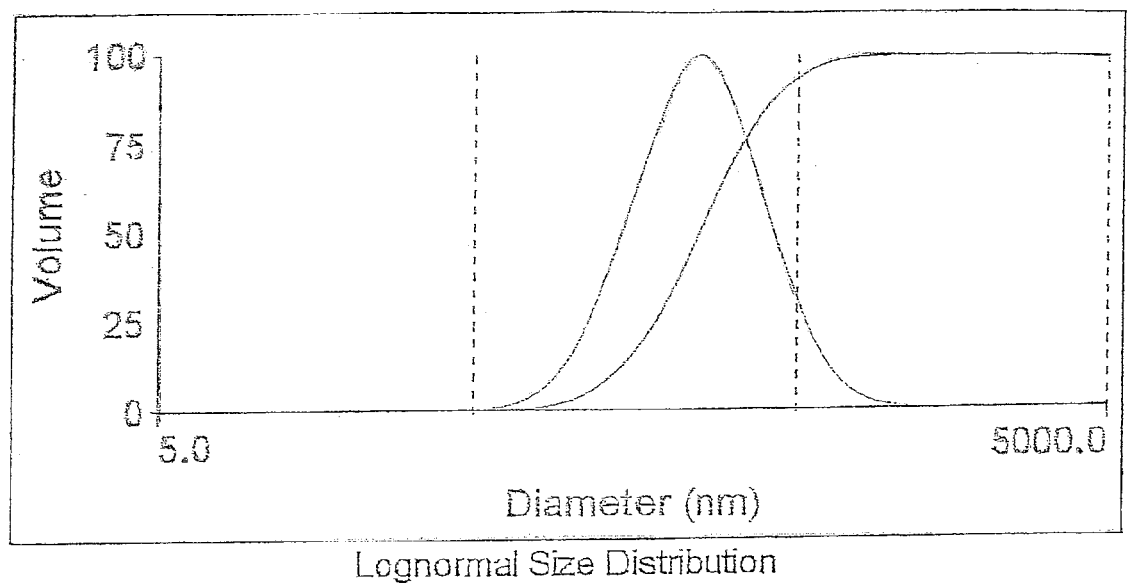
FIG. 2 is a graph of the volume size distribution of polystyrene particles obtained using a method as defined in EXAMPLE 1(a)

Analysis of PS Particles:

Analysis of the morphology of PS particles in the aqueous colloidal suspension obtained was performed using Transmission Electron Microscopy. The size distribution analysis was carried out using Dynamic Light Scattering (DLS). From the Transmission Electron Micrograph (TEM), it was determined that in all cases polystyrene particles were in the form of isolated spherical particles having a nearly uniform size in the nanometer range. From the DLS results, the mean size of the particles produced in EXAMPLE 1(a) had a volume average of 276 nanometers (nm) and a number average of 145 nm with a polydispersity of 0.26. The graph in FIG. 2 illustrates the volume size distribution, in nanometers, of the polystyrene particles produced in EXAMPLE 1(a).

Examples 1(b)–1(f)

Effect of Pressure and Temperature on PS Particle Size

EXAMPLES 1(b)–1(f) were performed to determine the effect of pressure and temperature on the size of the polystyrene particles produced by a method according to the invention. Specifically, EXAMPLES 1(b)–1(f) were produced at differing pressure and temperature values using the EMULSION 1(b), as listed in TABLE 1 below.

Preparation of PS Emulsion.

EMULSION 1(b) was prepared the same as EMULSION 1(b), except as detailed below. Initially, 0.21 grams of polystyrene and 0.2 grams of SPAN-80 (surfactant) were dissolved into 20 grams of toluene to form a solution. This solution was then added to 200 grams of water containing 0.3 grams of TWEEN-80 (surfactant) to form a mixture. This mixture was emulsified using a commercially available homogenizer (model MY110) at 12,000 psi pressure (3 passes) to form EMULSION 1(b). The size distribution of the droplet sizes was obtained using DLS. The mean droplet size of the emulsion was 184 nm, with a standard deviation of 34 nm.

Production of PS Particles.

The PS particles for EXAMPLE 1(b)–1(f) were produced in the same manner as the particles in EXAMPLE 1(a), except as listed in TABLE 1. The pressure and temperature was varied to determine the effect of pressure and temperature on PS particle size (see TABLE 1).

Analysis of PS Particles.

The size distribution analysis of the particles obtained from these experiments was carried out using DLS. The results of the DLS analysis are reported in TABLE 1. TABLE 1 shows that the particles sizes for EXAMPLE 1(b)–1(f) are reduced relative to EXAMPLE 1(a). Increasing the degree of homogenization in EXAMPLE 1(b) results in smaller emulsions droplets, which in turn leads to smaller particle sizes after precipitation.

TABLE 1

Mean size of PS particles obtained at different Pressure and Temperature values for EXAMPLES 1(b)–1(f) using EMULSION 1(b).

| Ex. No. | Pressure (bar) | Temperature (° C.) | Mean particle size (nm) | |
|---|---|---|---|---|
| | | | Num. Avg. (% Dev.) | Vol. Avg. (% Dev.) |
| 1(b) | 80 | 45 | 33.3 (59.5%) | 95.5 (59.5%) |
| 1(c) | 80 | 55 | 53.7 (44.6%) | 111.1 (44.6%) |
| 1(d) | 90 | 45 | 39.6 (52.3%) | 102.9 (52.3%) |
| 1(e) | 100 | 45 | 36.8 (55.9%) | 104.4 (55.9%) |
| 1(f) | 80 | 35 | 49.4 (44.8%) | 100.2 (44.8%) |

Example 2

Generally, EXAMPLES 2(a)–2(m) illustrate the production of EUDRAGIT RS (EU) particles by a method according to the invention using a partially water soluble organic solvent. Specifically, EXAMPLES 2(a)–2(d) illustrate the effect of surfactant concentration on EU particle size, EXAMPLES 2(e)–2(h) illustrate the effect of solvent concentration on EU particle size, EXAMPLES 2(i)–2(m) illustrate the effect of concentration of the solute in the solution on EU particle size.

Examples 2(a)–2(e)

Effect of Surfactant Concentration EU Particle Size

Preparation of EUDRAGIT (EU) Emulsion:

Initially, an EU solution was prepared by dissolving 5% (w/$w_{EA}$) of EUDRAGIT RS (EU) into a first portion (20 grams) of water-saturated ethyl acetate (EA) solution to form an EU solution. This EU solution was then added to a second portion (180 grams) of water-saturated EA solution containing poly vinyl alcohol surfactant (PVA) to form a mixture. Accordingly, the resultant concentrations were EA at 10% w/w total, water at 90% w/w total, EU at 5% w/w EA, and PVA at 1%w/w water. The mixture was emulsified using a dispersator for 2 minutes at 3000 rpm to form EMULSION 2.

While EMULSION 2 is the standard emulsion used in EXAMPLE 2, the PVA concentration was varied in EXAMPLES 2(a)–2(d), see TABLE 2. The solvent concentration was varied in EXAMPLES 2(e)–2(h), see TABLE 3. The EU concentration in solution was varied in EXAMPLES 2(i)–2(m), see TABLE 4. All other parameters were maintained constant.

Production of EUDRAGIT Particles:

For EXAMPLES 2(a)–2(d), 4.0 ml aliquots of EMULSION 2, having differing surfactant concentrations, were loaded into an extraction chamber having a volume of 10 ml. Glass wool and beads were packed inside the dead volume of the extraction chamber to prevent liquid entrainment during extraction, and to minimize the re-precipitation of the residual toluene during depressurization.

Supercritical $CO_2$ was bubbled through a 0.5 µm stainless steel frit at the bottom of the extraction chamber and into the prepared extraction chamber. A 1 ml/min flow rate of carbon dioxide was used. The temperature and pressure were kept constant at 80 bar and 35° C., respectively.

The amount of EA extracted from the chamber was measured using a photo diode array UV/VIS detector. Almost all of the EA was extracted out of the emulsion within 30–40 minutes. The extraction chamber was depressurized and an aqueous colloidal suspension of EU polymer particles was obtained.

Figure 3:
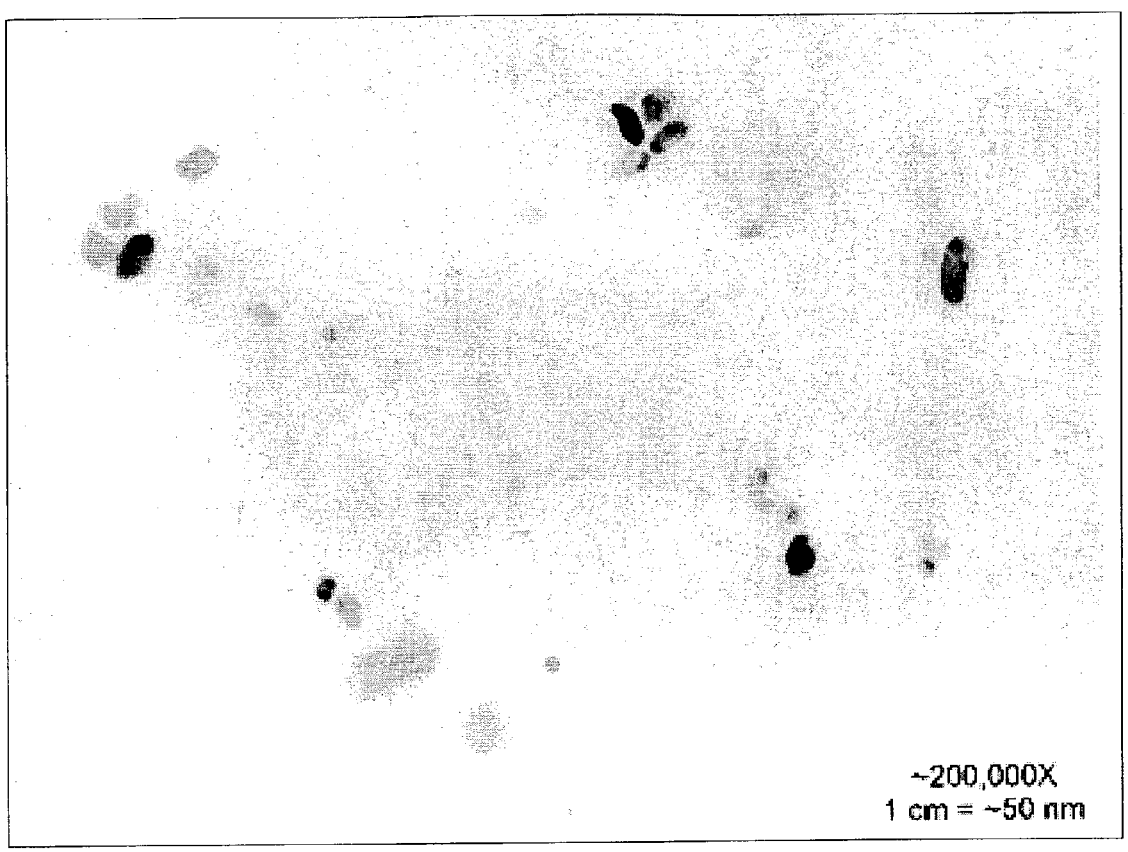
FIG. 3 is a TEM micrograph of EUDRAGIT RS (EU) particles produced in EXAMPLE 2(a)

Analysis of EUDRAGIT (EU) Particles:

Analysis of the morphology of particles in the aqueous colloidal suspension obtained from EXAMPLES 2(a)–2(d) was performed using a transmission electron microscope (TEM). Where applicable, the hydrodynamic radius of particles was measured using a Dynamic Light Scattering (DLS) instrument. FIG. 3 is a TEM micrograph of the EUDRAGIT RS particles produced in EXAMPLE 2(a). The magnification of the TEM in FIG. 3 is about 200,000, and the EU particles have diameters in the nanometer range.

Unexpectedly, increasing the surfactant concentration resulted in an increase in the EU particle number average. The results are listed in TABLE 2.

TABLE 2

The effect of surfactant concentration on EU particle size.

| Ex. No. | Surfactant %(w/w oil) | Num. Avg. (nm) | Std. Dev. (nm) | Vol. Avg. (nm) | Std. Dev. (nm) |
|---|---|---|---|---|---|
| 2(a) | 0.5 | 72 | 52 | 633 | 451 |
| 2(b) | 1 | 40 | 25 | 247 | 151 |
| 2(c) | 2 | 66 | 40 | 400 | 242 |
| 2(d) | 5 | 151 | 58 | 309 | 118 |

Examples 2(e)–2(h)

Effect of Solvent Concentration on Particle Size

Preparation of EU Emulsion and Particle Production.

The EXAMPLES 2(e)–2(h) were prepared in the same manner as the EXAMPLES 2(a)–2(d), except as indicated in TABLE 3. The ratio of EU solution to water, or emulsion concentration, was varied to determine the effect of the concentration of solution in water on particle size. EU particle production was carried out in the same manner as in EXAMPLES 2(a)–2(d).

Analysis of EU Particles.

Figure 4:
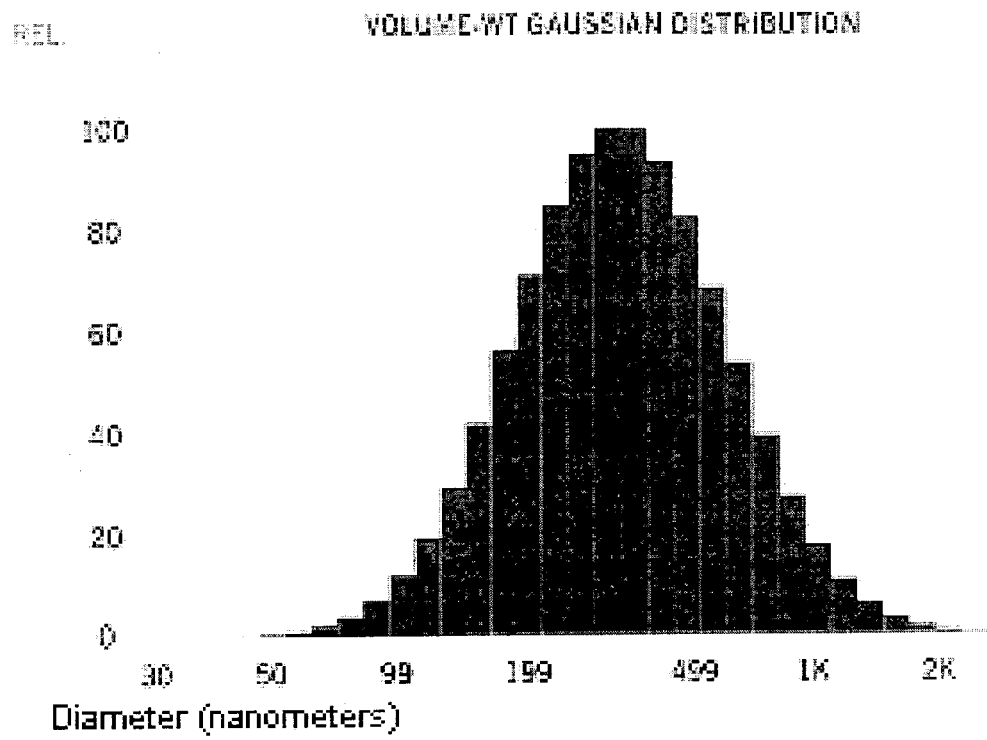
FIG. 4 is a volume size distribution graph of the EU particles produced in EXAMPLE 2(f)
Figure 5:
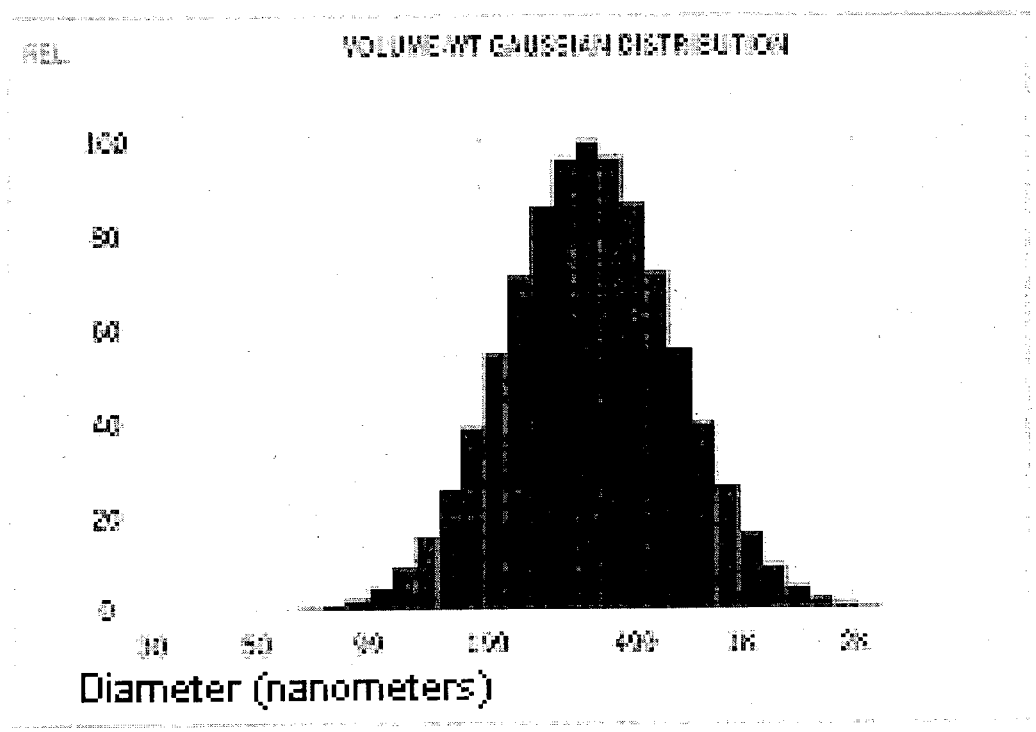
FIG. 5 is a volume size distribution graph of the EU particles produced in EXAMPLE 2(h)

Size and morphology analysis of EU particles produced in EXAMPLES 2(e)–2(h) was done in the same manner as described in EXAMPLE 2(a)–2(d), that is, using TEM and DLS, respectively. As the oil (EU solution) concentration in the emulsion increases, the EU particle size increases. This is indicated by the results as listed in TABLE 3. FIGS. 4–5 are volume size distribution graphs of EU particles produced in EXAMPLES 2(f) and 2(h), respectively.

TABLE 3

The effect of concentration of oil in the emulsion on EU particle size.

| Ex. 2 | Oil %(w/w) | Water %(w/w) | Num. Avg. (nm) | Std. Dev. (nm) | Vol. Avg. (nm) | Std. Dev. (nm) |
|---|---|---|---|---|---|---|
| 2(e) | 10 | 90 | 40 | 25 | 147 | 90 |
| 2(f) | 20 | 80 | 99 | 52 | 456 | 240 |
| 2(g) | 30 | 70 | 74 | 43 | 436 | 254 |
| 2(h) | 40 | 60 | 70 | 42 | 416 | 244 |

Examples 2(i)–2(m)

Effect of Polymer Concentration on Particle Size

Preparation of EU Emulsion and Particle Production.

EXAMPLES 2(i)–2(m) were prepared in the same manner as the EXAMPLES 2(e)–2(h), except as indicated in TABLE 4. The ratio of EU in solution was varied to determine the effect of the concentration of the EU in the solution on particle size. EU particle production was carried out in the same manner as in EXAMPLES 2(a)–2(e).

Analysis of EU Particles.

Size and morphology analysis of EU particles was done in the same manner as described in EXAMPLE 2(a)–2(d) using DLS and TEM respectively. Results of precipitation experiments using emulsions having differing EUDRAGIT RS concentrations are shown in TABLE 4. Unexpectedly, an increase in the polymer content in the solution decreases the EUDRAGIT RS particle size.

TABLE 4

The effect of concentration of EU in solution on EU particle size.

| Ex. 2 | Polymer % (w/w oil) | Num. Avg (nm) | Std. Dev. (nm) | Vol. Avg. (nm) | Std. Dev. (nm) |
|---|---|---|---|---|---|
| 2(i) | 1.25 | 48 | 29 | 205 | 121 |
| 2(j) | 5 | 40 | 25 | 147 | 90 |
| 2(k) | 10 | 35 | 20 | 101 | 57 |
| 2(l) | 20 | 53 | 34 | 294 | 187 |
| 2(m) | 30 | 36 | 21 | 115 | 65 |

Example 3

EXAMPLE 3 determines the characteristics of the precipitation of Poly Lactic/Glycolic Acid (PLGA) micro and nanoparticles using partially water soluble organic solvents in accordance with the present invention. PLGA is generally accepted as being a biodegradable polymer. In particular, EXAMPLES 3(a)–3(d) illustrate the effect of solvent concentration variation in an emulsion on particle size. EXAMPLES 3(e)–3(g) illustrate the effect of polymer concentration in an emulsion on particle size. EXAMPLE 3(h) illustrates the precipitation of polymer nanoparticles, and EXAMPLE 3(i) illustrates the effect of precipitation of PLGA particles without bubbling $CO_2$ through the emulsion.

Examples 3(a)–3(d)

Effect of Solvent Concentration Variance

Preparation of PLGA Emulsion:

EMULSIONS 3(a)–3(d) were prepared having different EA concentrations and constant PVA and PLGA concentrations as listed in TABLE 5. Poly Lactic/Glycolic Acid (PLGA) was dissolved in water saturated with Ethyl Acetate (EA) to form a solution in proportions as shown in TABLE 5. The solution was added to a measured amount of 0.5% (w/w) aqueous solution of Poly Vinyl Alcohol (PVA) to form a mixture. The mixture was emulsified using a dispersator for 3 minutes at 5000 rpm to form EMULSIONS 3(a)–3(d), respectively.

Production of PLGA Particles.

The particles in EXAMPLES 3(a)–3(d) were prepared as follows. 4.0 ml aliquots of EMULSIONS 3(a)–3(d) were individually loaded into an extraction chamber. PLGA particles were produced in a similar manner relative to the particles produced in EXAMPLE 2, except as follows: The extraction chamber was maintained at a constant operating pressure and temperature. The flow rate of the $CO_2$ through the extraction chamber was maintained at a constant rate. Specifically, a pressure of 80 bar, a temperature of 45° C., and a flow rate of 1 ml/min of $CO_2$ was employed. The amount of solvent extracted from the chamber was measured using a photo diode array UV/VIS detector. After complete extraction of EA the extraction chamber was depressurized and an aqueous colloidal suspension of particles was obtained.

Analysis of PLGA Particles.

In all the EXAMPLES 3(a)–3(d), almost all of the EA was extracted out of the emulsions after 60 minutes, and the residual EA was determined to be less than 100 ppm in all cases. The particles were washed and filtered to remove PVA from the aqueous suspensions prior to analysis.

Figure 6:
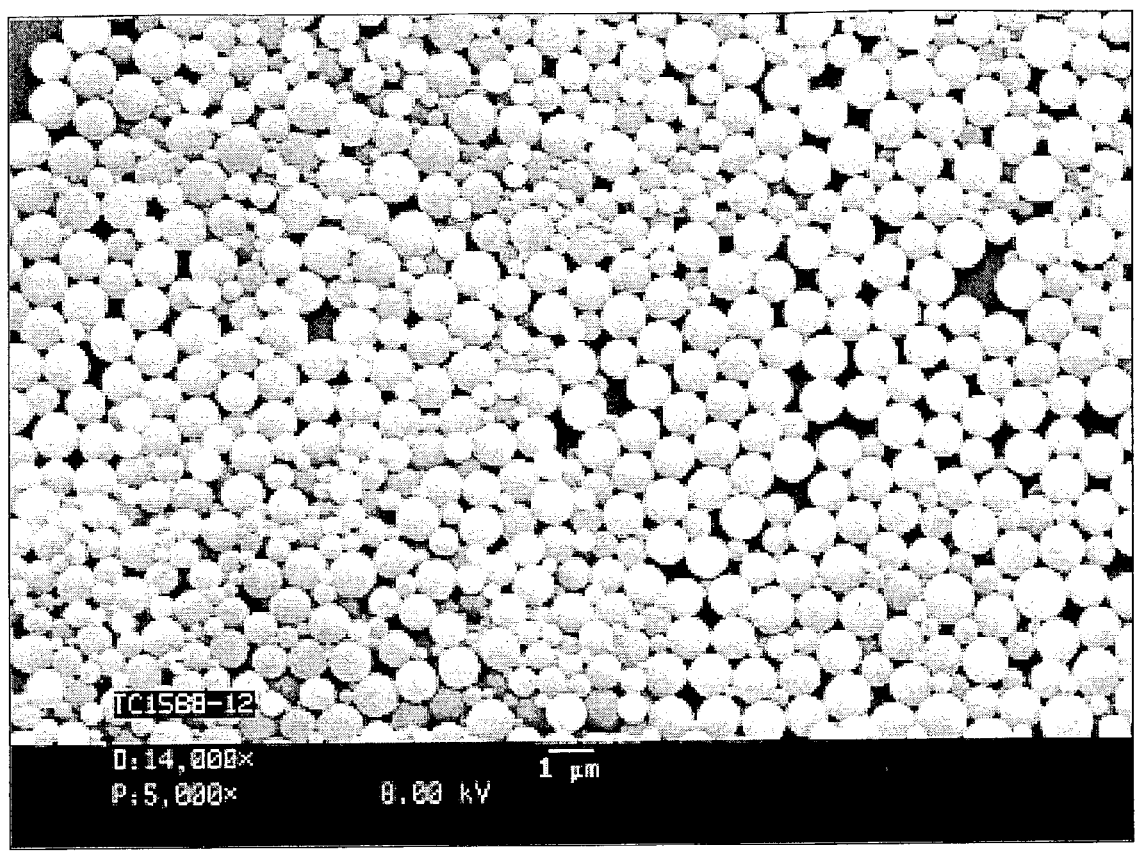
FIG. 6 is an SEM micrograph of the Poly Lactic/Glycolic Acid (PLGA) particles produced in EXAMPLE 3(a)

Analysis of the morphology of PLGA particles in the aqueous colloidal suspension obtained was performed using Scanning Electron Microscopy (SEM). FIG. 6 is an SEM micrograph of PLGA particles obtained from EXAMPLE 3(a). The scale is 1 micrometer, so the PLGA particles are sub-micron, non-agglomerated, spherical in shape and have a narrow size distribution. The size distribution analysis was carried out using Dynamic Light Scattering (DLS). Results of precipitation experiments using emulsions having differing solvent or EA concentrations are shown in TABLE 5. Increasing the relative percentage of EA in the emulsion unexpectedly resulted in a decrease in the number average and the volume average of the PLGA particles.

TABLE 5

Sizes of PLGA particles obtained from emulsions having differing EA concentrations.

| Ex. No. | EA (% w/w total) | Num. Avg. (nm) | Std. Dev. (nm) | Vol. avg. (nm) | Std. Dev. (nm) |
|---|---|---|---|---|---|
| 3(a) | 10 | 408 | 222 | 1178 | 642 |
| 3(b) | 20 | 234 | 141 | 1088 | 653 |
| 3(c) | 30 | 263 | 138 | 857 | 451 |
| 3(d) | 40 | 303 | 142 | 725 | 339 |

Examples 3(e)–3(g)

Effect of Variations in PLGA Polymer Concentration

Preparation of PLGA Emulsion.

EMULSIONS 3(e)–3(g) were prepared in the same manner as EMULSIONS 3(a)–3(d) except that the following emulsions were prepared having different PLGA concentrations and constant PVA and EA concentrations as listed in TABLE 6.

Production of PLGA Particles.

Particle production in EXAMPLES 3(e)–3(g) was performed in a manner similar to the manner that was used in EXAMPLES 3(a)–3(d).

Figure 7:
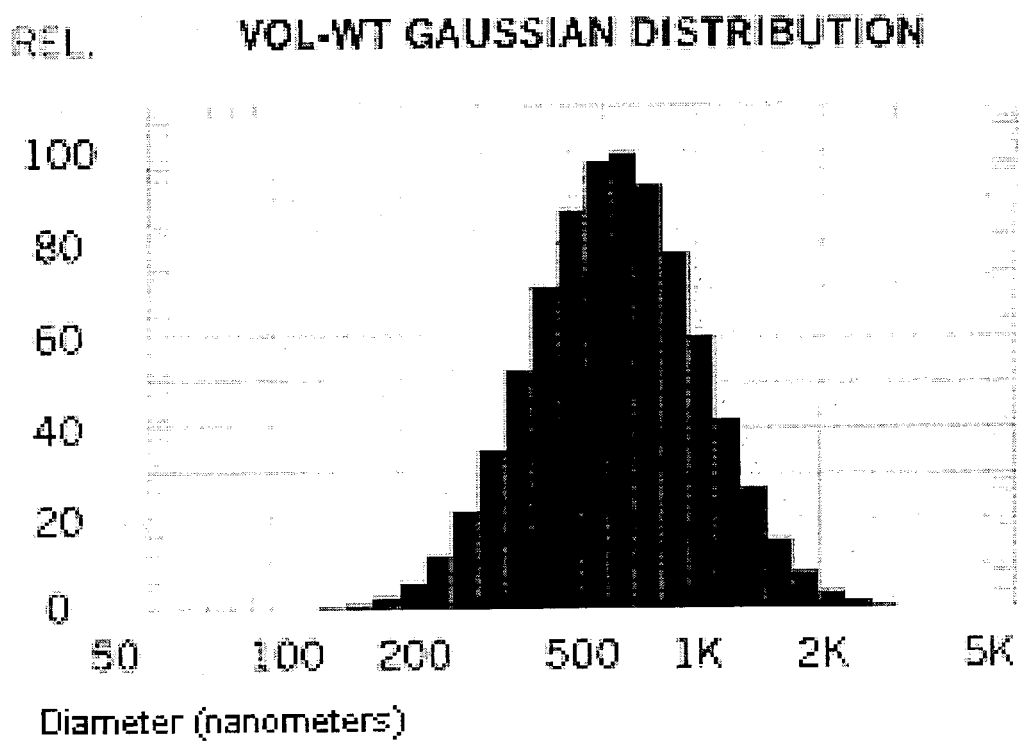
FIG. 7 is a volume size distribution graph of the PLGA particles produced in EXAMPLE 3(e)
Figure 8:
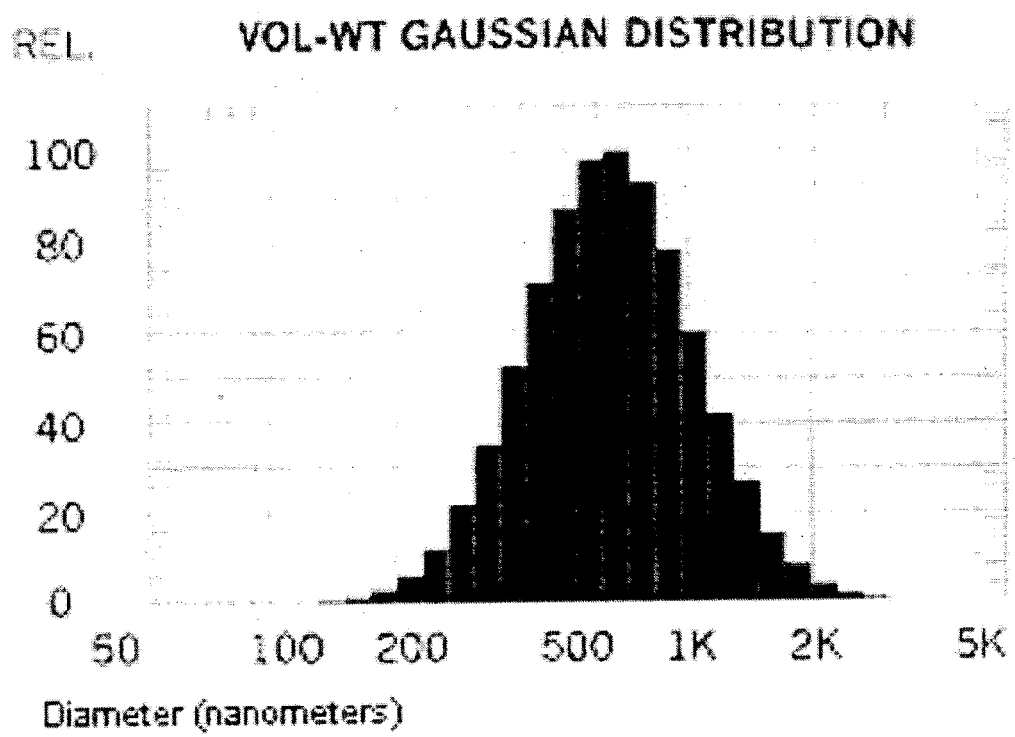
FIG. 8 is a volume size distribution graph of the PLGA particles produced in EXAMPLE 3(f)

Analysis of PLGA Particles:

Size and morphology analysis of PLGA particles produced in EXAMPLES 3(e)–3(g) was done in the same manner as described in EXAMPLE 3(a)–3(d) using DLS and SEM respectively. Results of precipitation experiments using emulsions having differing PLGA concentrations are shown in TABLE 6. FIGS. 7–8 are volume size distribution graphs of the PLGA particles produced in examples 3(e) and 3(f), respectively. The diameters are in the nanometer range.

TABLE 6

Effect of differing PLGA concentrations on particle size.

| Ex. No. | PLGA w % EA | Num. Avg. (nm) | Std. Dev. (nm) | Vol. Avg. (nm) | Std. Dev. (nm) |
|---|---|---|---|---|---|
| 3(e) | 5 | 408 | 222 | 1178 | 642 |
| 3(f) | 10 | 723 | 444 | 2279 | 1399 |
| 3(g) | 20 | 467 | 207 | 1848 | 1324 |

Example 3(h)

Effect of Emulsion Homogenization on Particle Size

Preparation of Poly Lactic/Glycolic Acid (PLGA) Emulsion:

4.01 grams of Poly Lactic/Glycolic Acid (PLGA) was dissolved in 40.1 grams of water saturated with Ethyl Acetate (EA). The solution was added to 160 grams of 0.5% (w/w) aqueous solution of Poly Vinyl Alcohol (PVA) to form a mixture. The mixture was emulsified using a dispersator for 3 minutes at 5000 rpm, and then homogenized at 14,000 psi (3 passes) using a commercially available Microfluidizer (model M110-L) to form EMULSION 3(h).

Production of PLGA Particles.

A 4.0 ml aliquot of EMULSION 3(h) was loaded into an extraction chamber. PLGA particles were produced in a similar manner relative to the particles produced in EXAMPLE 3(a). The extraction chamber was maintained at a constant operating pressure and temperature. The flow rate of the $CO_2$ through the extraction chamber was maintained at a constant rate. Specifically, a pressure of 80 bar, a temperature of 45° C., and a flow rate of 1 ml/min of $CO_2$ was employed. The amount of solvent extracted from the chamber was measured using a photo diode array UV/VIS detector. After complete extraction of EA the extraction chamber was depressurized and an aqueous colloidal suspension of particles was obtained.

Analysis of PLGA Particles.

Figure 9:
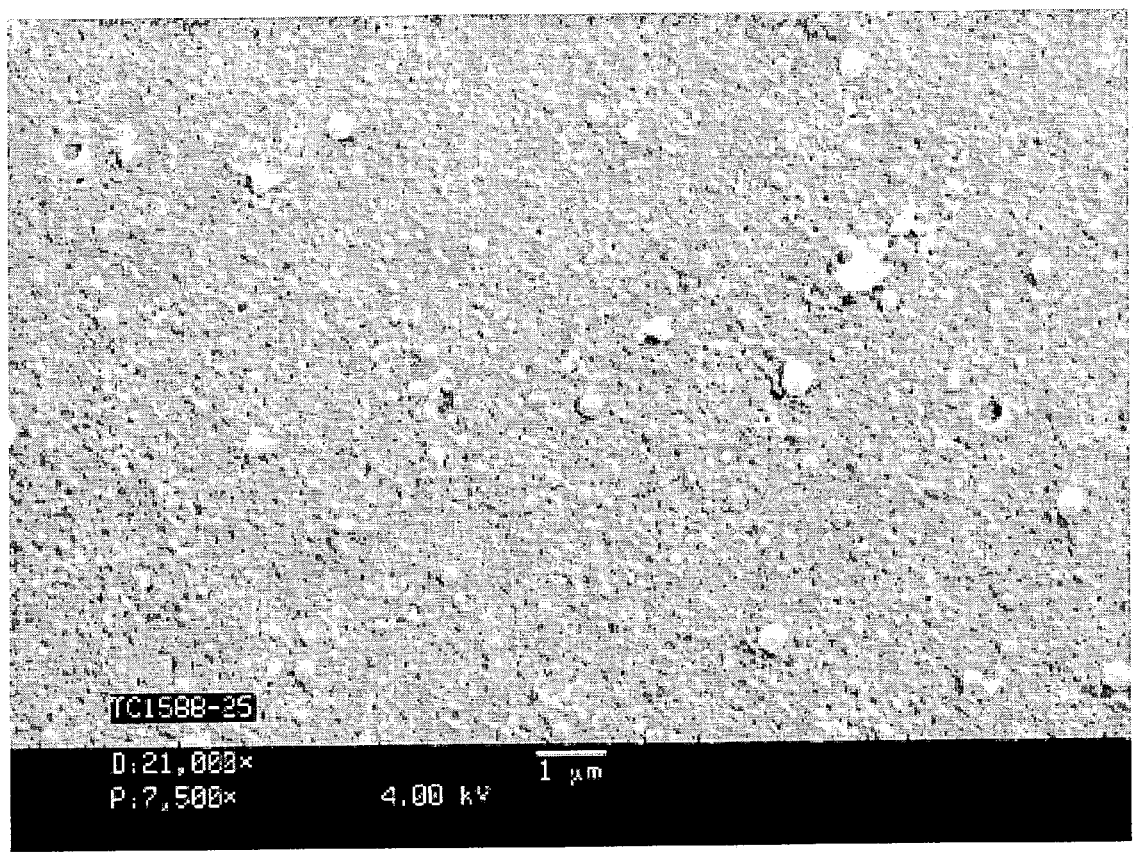
FIG. 9 is an SEM micrograph of the PLGA particles produced in EXAMPLE 3(h)

Size and morphology analysis of the aqueous colloidal suspension of particles obtained from EXAMPLE 3(h) was performed using a scanning electron microscope (SEM). The hydrodynamic diameter of the PLGA particles was measured using dynamic light scattering (DLS) instrument. DLS analysis of the particles obtained from EXAMPLE 3(h) showed that the mean volume and number average diameter of the particles obtained was 217 nm and 117 nm, respectively. FIG. 9 is a micrograph of nanoparticles produced in EXAMPLE 3(h).

The results illustrate that homogenization and droplet size affect the size of the resultant particle. Accordingly, control over particle size can be obtained by selecting such parameters as rotor speed, shear force, shear type, time of homogenization, various permutations of the parameters, and the like.

Example 3(i)

Effect of Single or Reduced Interface on PLGA Particle Size

EXAMPLE 3(i) is performed the same as EXAMPLE 3(g) and also uses EMULSION 3(g), however, rather than bubbling $CO_2$ into the extraction chamber through a frit and further through the emulsion, supercritical $CO_2$ was introduced into the extraction chamber top, and the $CO_2$ was also removed from the top without passing it through the emulsion. That is, the supercritical $CO_2$ contacted the emulsion along a single or reduced interfacial surface area and did not bubble through, or dissolve through, the emulsion.

Analysis of PLGA Particles.

Figure 10:
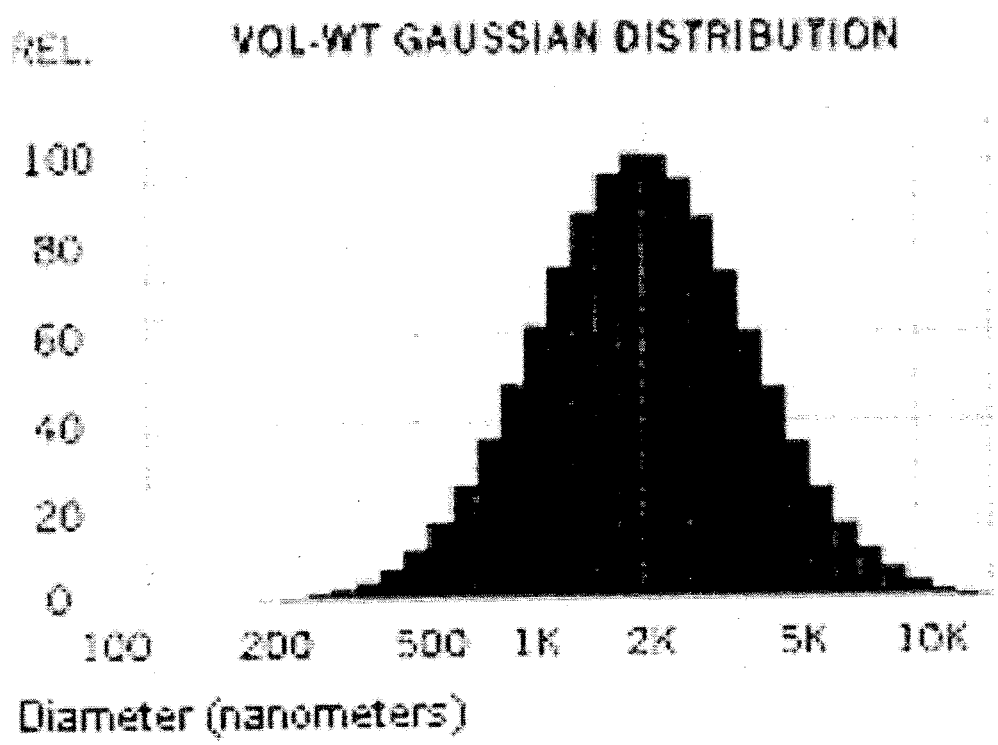
FIG. 10 is a volume size distribution graph of the PLGA particles produced in EXAMPLE 3(i)
Figure 11:
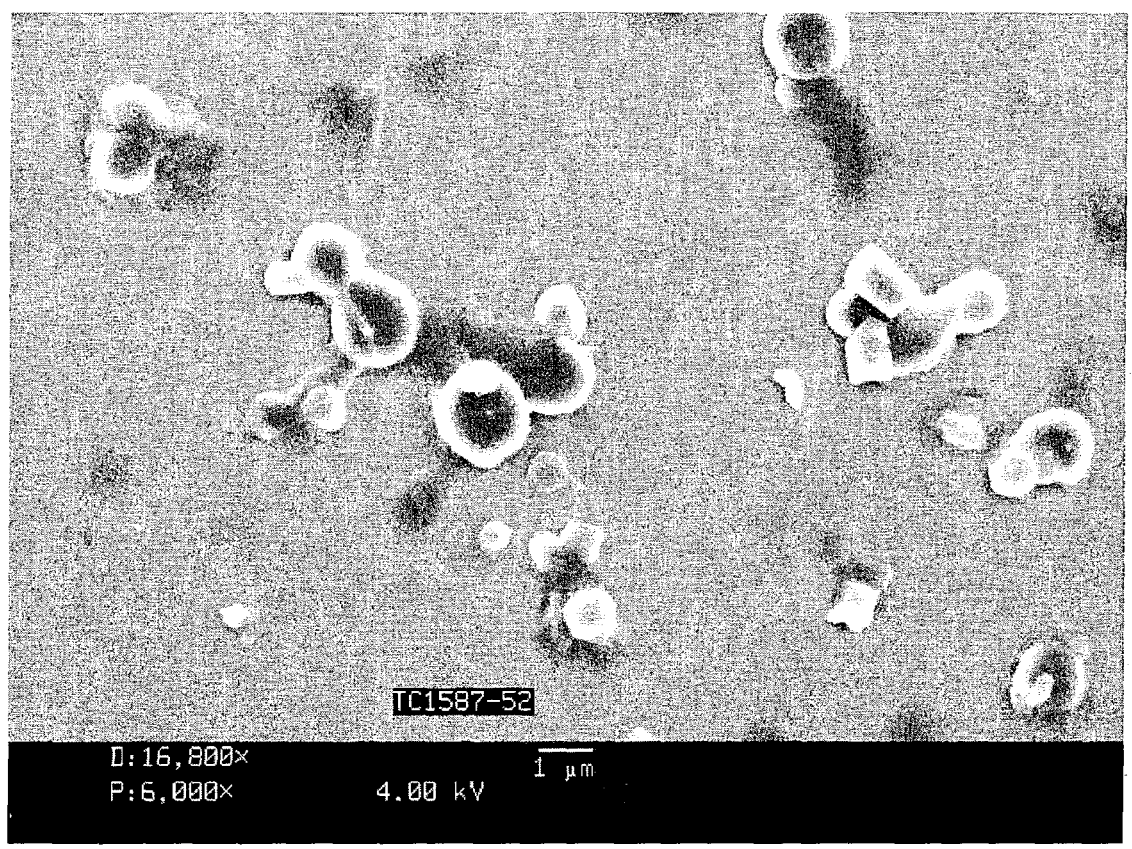
FIG. 11 is a scanning electron micrograph of Cholesterol Acetate (CA) particles produced in EXAMPLE 4(a)

Analysis of PLGA particles was performed in the same manner as EXAMPLE 3(h). The Mean Volumetric average of the PLGA particles was 2408 nanometers (nm) and the number average was 656 nanometers (nm). FIG. 10 is a volume size distribution graph of the PLGA particles produced in EXAMPLE 3(i), the average diameter is in the nanometer range.

Example 4

Cholesterol Acetate (a water insoluble steroid) nanoparticles are precipitated in accordance with a preferred embodiment of the present invention. In the following examples CA emulsion is injected into the extraction chamber, containing supercritical $CO_2$ using a fine nozzle.

Preparation of Cholesterol Acetate (CA) Emulsion:

In EXAMPLES 4(a)–4(c), a measured amount of Cholesterol Acetate (CA) was dissolved in 10.0 g water saturated EA to form a solution. This solution was then added to 90.0 g of an EA saturated aqueous solution of 1%(w/w water) PVA to form a mixture. The mixture was homogenized using a dispersator at 5000 rpm for 3 minutes to form EMULSIONS 4(a)–4(c) as listed in TABLE 7.

Production of Cholesterol Acetate (CA) Particles.

The CA nanoparticles were prepared using an apparatus similar to the apparatus 100 shown in FIG. 1, a difference being that emulsion is sprayed into the chamber through a nozzle extending through a sidewall rather than through the inlet 146. A component of the apparatus used consisted of a precipitation chamber having a volume of 100 milliliters. EMULSIONS 4(a)–4(c) were injected into the precipitation chamber using an HPLC pump. The precipitation chamber is maintained at a constant temperature using a heating jacket. The pressure and temperature parameters were 100 bar and 40° C., respectively.

The method of EXAMPLES 4(a)–4(c) was performed in a continuous manner. The precipitation chamber was pressurized with supercritical carbon dioxide up to the desired operating pressure at the desired operating temperature. Carbon dioxide flow rate through the precipitation cell was maintained constant at 16 ml/min. Emulsion prepared in example 1 was injected into the precipitation chamber at a constant flow rate of 1.0 ml/min through a 50-micron nozzle. As the emulsion was injected into the precipitation chamber and atomized into tiny droplets. From the droplets, EA was continuously extracted by the supercritical carbon dioxide from the droplets. Due to the extraction of the EA, particles of solute precipitated from solution.

The flow of emulsion into the precipitation chamber was maintained for 10 minutes after which the excess residual EA was washed from the precipitation chamber by purging it with fresh carbon dioxide for 120–180 minutes. The precipitation chamber was then allowed to slowly depressurize until it reached ambient pressure and the aqueous suspension of CA particles was collected and analyzed.

Analysis of Cholesterol Acetate (CA) Particles.

Figure 12:
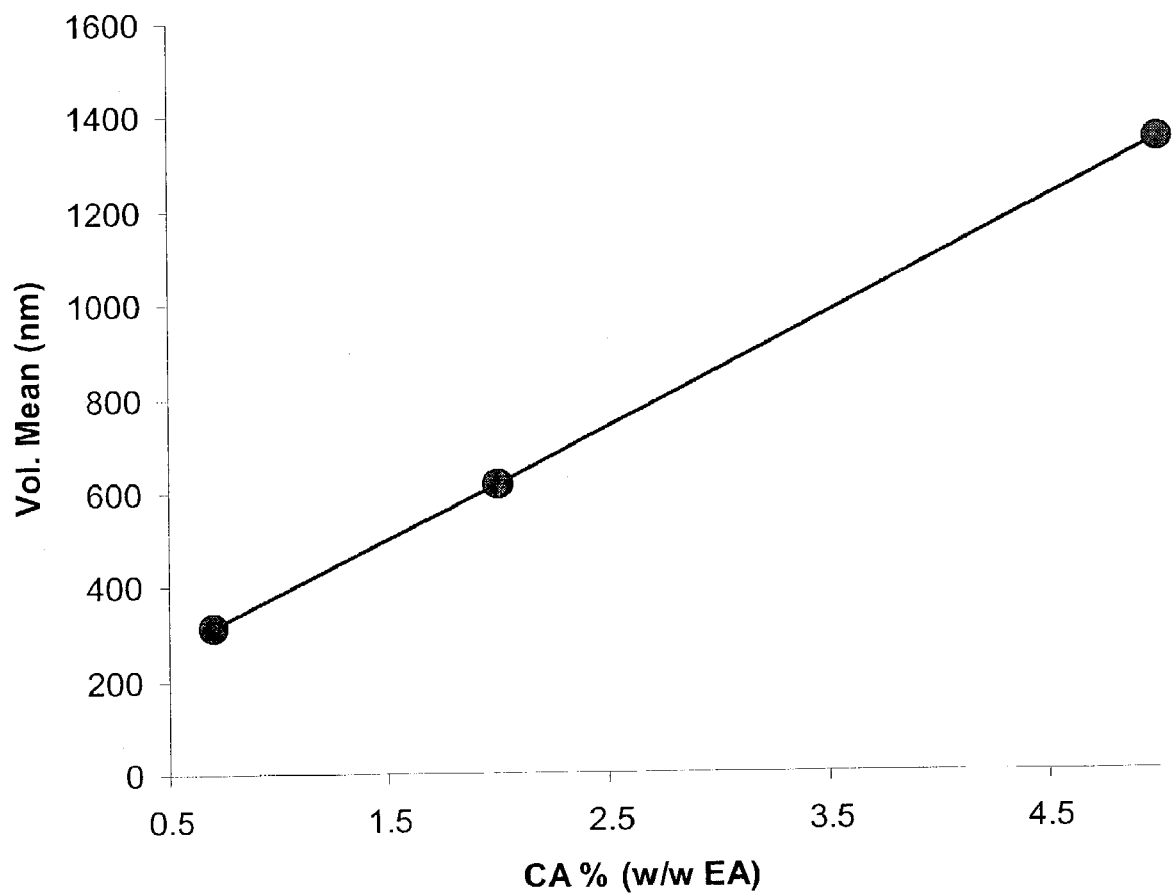
FIG. 12 is a graph of particle size versus concentration of CA.
Figure 13:
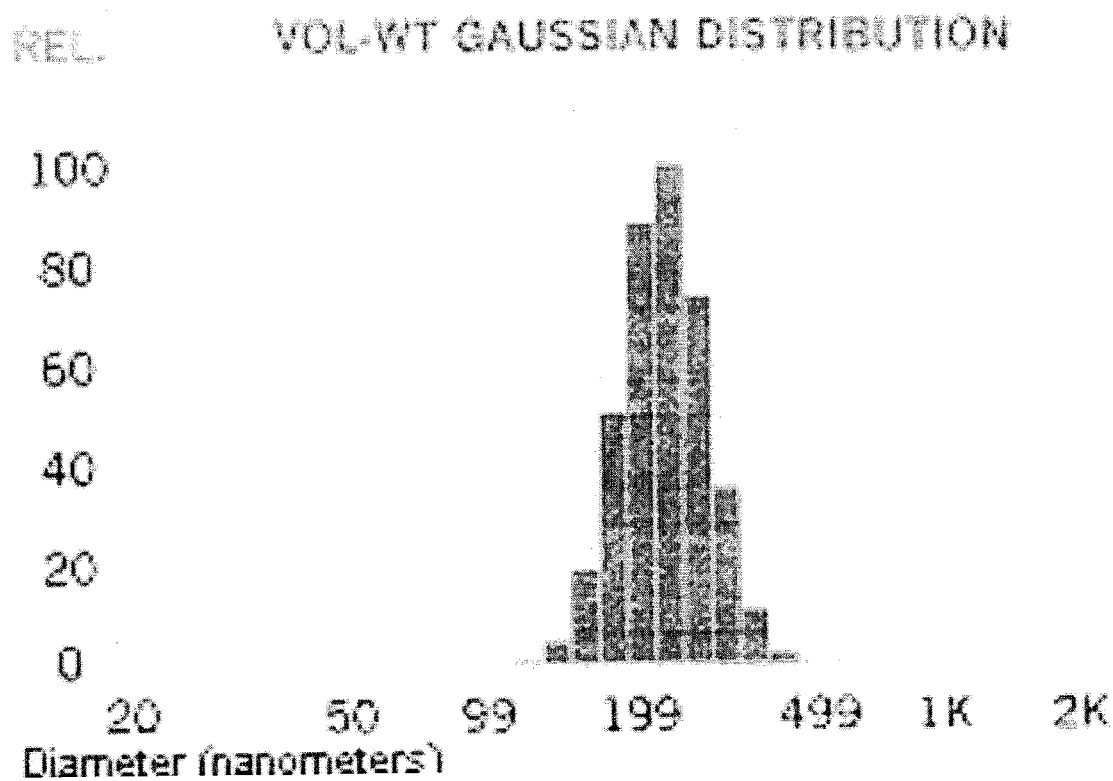
FIG. 13 is a volume size distribution graph of the CA particles produced in EXAMPLE 4(a)

Size analysis of particles obtained in EXAMPLE 4(a)–4(c) was determined using DLS. Analysis of CA particle morphology was carried out using SEM, as shown by the SEM micrograph in FIG. 1. The particles appear uniform and have a small spherical or cylindrical shape. The CA particles have a narrow size distribution. There is an increase in CA particle size with an increase in CA concentration in the emulsion. In EXAMPLES 4(a)–4(c), the relationship between the mean particle size and the CA content is shown graphically in FIG. 12, the results are listed TABLE 7. FIG. 13 is a volume weight distribution-graph of CA particles produced in EXAMPLE 4(a).

TABLE 7

Parameters for CA particle production in which the CA concentration is varied.

| Ex. No. | CA %(w/w EA) | EA % (w/w Total) | PVA % (w/w H2O) | Vol. Avg. (nm) | Std. Dev. (nm) | Num. Avg. (nm) | Std. Dev. (nm) |
|---|---|---|---|---|---|---|---|
| 4(a) | 0.7 | 10 | 1.0 | 313 | 137 | 116 | 51 |
| 4(b) | 2 | 10 | 1.0 | 617 | 339 | 125 | 69 |
| 4(c) | 5 | 10 | 1.0 | 1344 | 948 | 176 | 124 |

Examples 4(d)–4(f)

Effect of Differing $CO_2$ Densities

Preparation of CA Emulsion.

EMULSIONS 4(d)–4(f) were prepared in a manner similar to the manner in which EMULSION 4(b) was prepared.

Production of Cholesterol Acetate (CA) Particles.

Particles in EXAMPLES 4(d)–4(f) were prepared in a manner similar to the manner in which particles in EXAMPLES 4(a)–4(c) were prepared, except for the differing carbon dioxide densities as listed in TABLE 8.

Analysis of Cholesterol Acetate (CA) Particles.

A generally uniform particle size was achieved independent of changes in the density of supercritical carbon dioxide. Accordingly, particle uniformity can be achieved and maintained with reduced concern of supercritical fluid densities. The results are listed in TABLE 8.

TABLE 8

Parameters for CA particle production in which the $CO_2$ density is varied.

| Ex. No. | $CO_2$ Density g/ml | Vol. Avg. (nm) | Std. Dev. (nm) | Num. Avg. (nm) | Std. Dev. (nm) |
|---|---|---|---|---|---|
| 4(d) | 0.628 | 617 | 339 | 125 | 69 |
| 4(e) | 0.839 | 641 | 358 | 124 | 69 |
| 4(f) | 0.485 | 631 | 332 | 151 | 80 |

Examples 4(g)–4(k)

of Solvent and Solute Concentrations on Particle Size

Production of Cholesterol Acetate (CA) Particles.

EXAMPLES 4(g)–4(k) were prepared in the same manner as EXAMPLE 3(a), except as indicated below. In EXAMPLE 44(g)–4(k), EMULSIONS 4(g)–4(k) were prepared as indicated in TABLE 9. The CA concentration and the EA concentration were varied to determine the effect of solvent and solute concentration on particle size. The EMULSIONS 4(g)–4(k) were homogenized using a commercially available microfluidizer (e.g., model M110-L) at a pressure of 14.5 Kpsi and in 3 passes. PVA was added at 0.5% w/w $H_2O$. For EXAMPLES 4(g)–4(k), corresponding EMULSIONS 4(g)–4(k) were used.

Analysis of Cholesterol Acetate (CA) Particles.

Figure 14A:
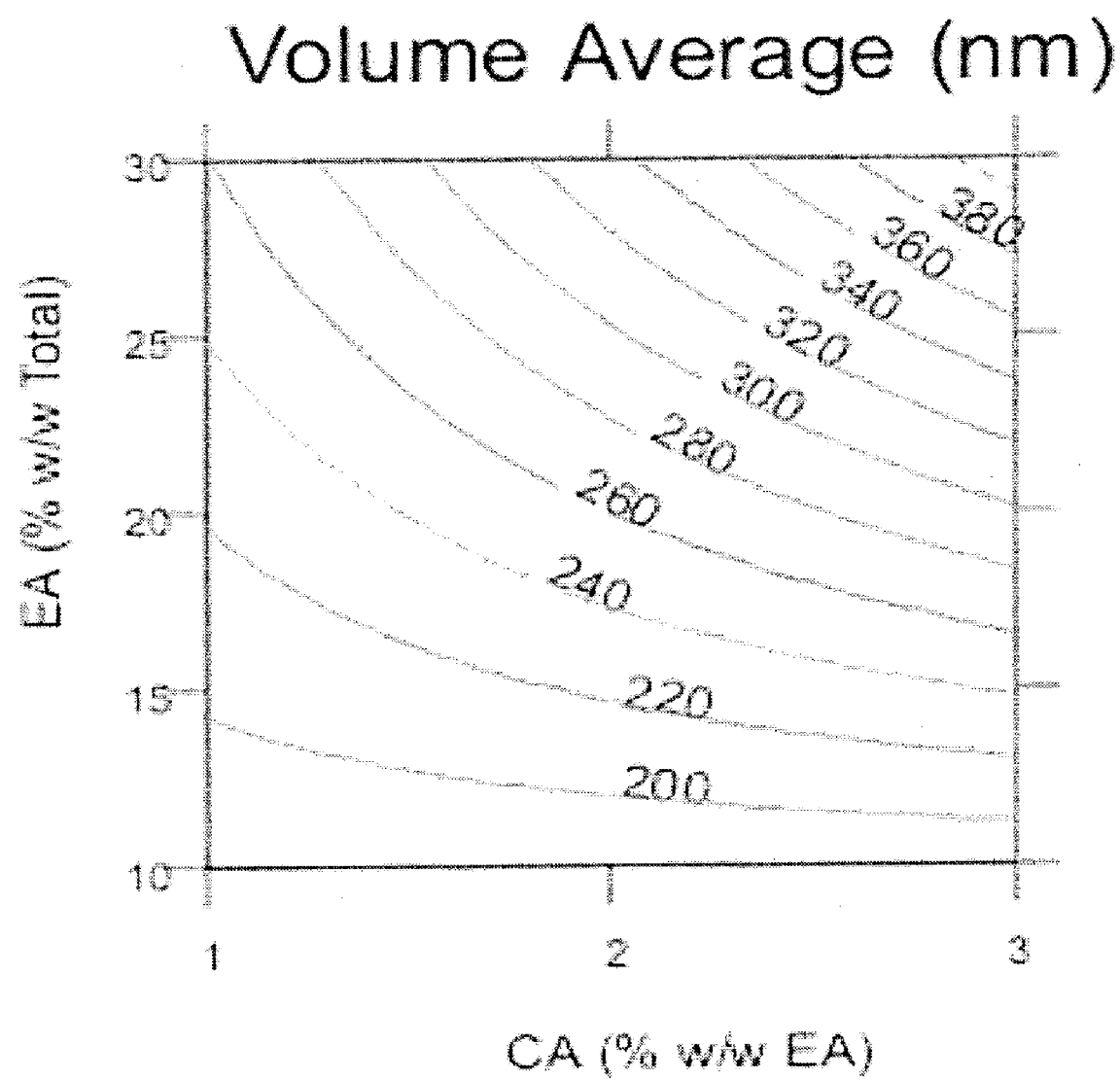
FIGS. 14($a$), 14($b$) and 14($c$) are multi-dimensional graphs of mean particle size versus concentration of CA and of Ethyl Acetate.
Figure 14B:
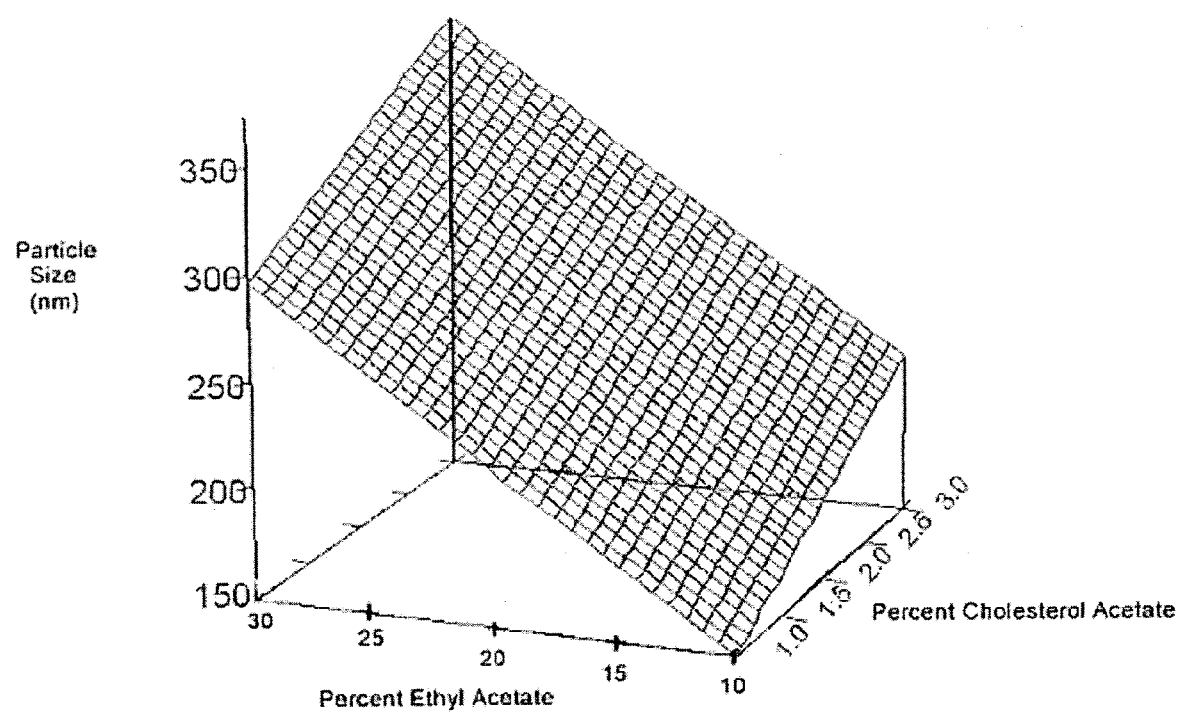
Figure 14C:
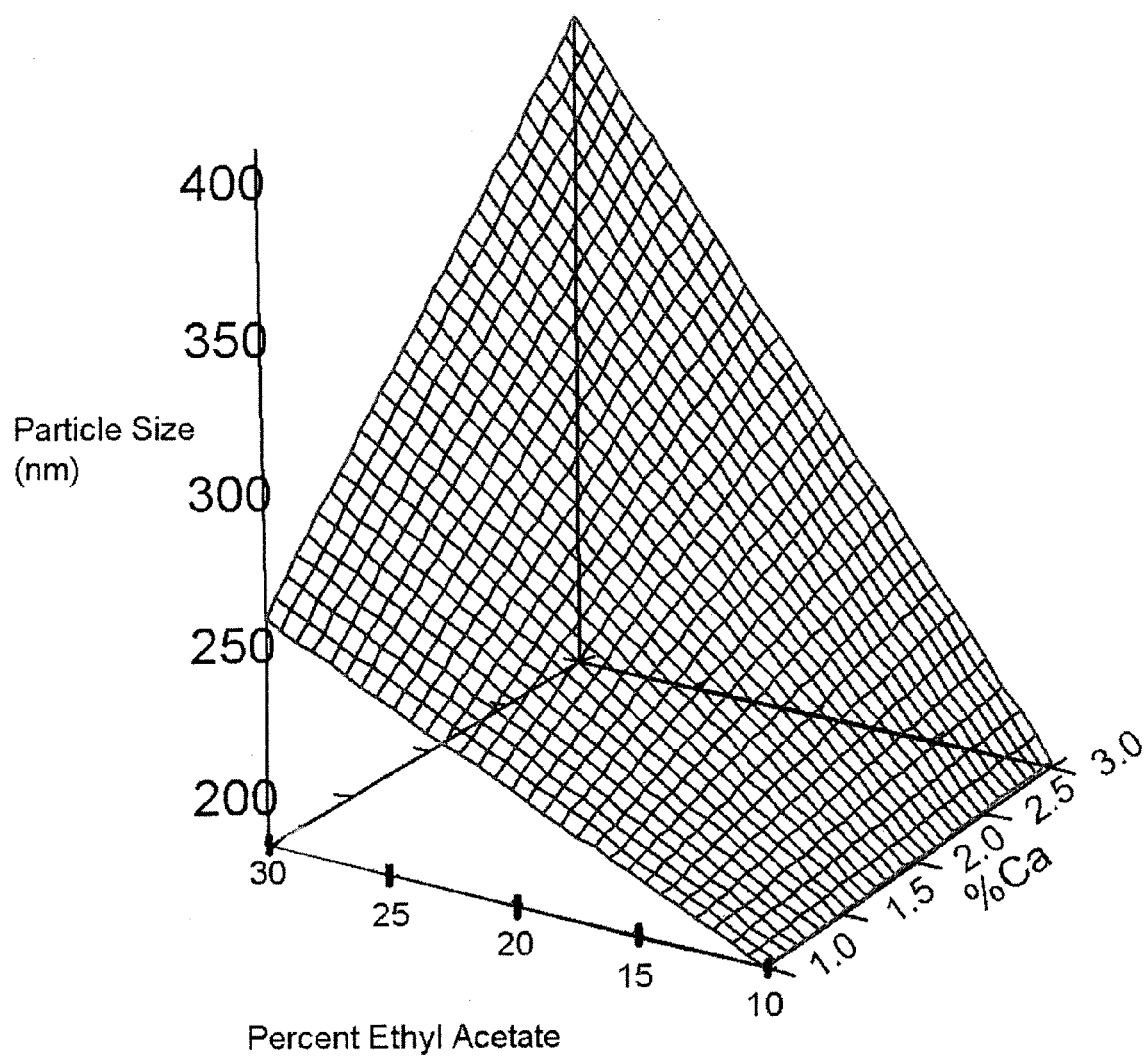

The sizes of CA particles of EXAMPLES 4(g)–4(k) are listed in TABLE 9. FIGS. 14(*a*), 14(*b*) and 14(*c*) are multi-dimensional graphs of volume (average or mean) particle size (in nanometers) versus concentration (in percent w/w total) of CA and EA for EXAMPLES 4(g)–4(k).

TABLE 9

Concentration of ingredients in EXAMPLES 4(g)–4(k).

| Ex. No. | Cholesterol Acetate % (w/w EA) | EA % (w/w Total) | Vol. Avg. (nm) | Std. Dev. (nm) | No. avg. (nm) | Std. Dev. (nm) |
|---|---|---|---|---|---|---|
| 4(g) | 2 | 20 | 315 | 78 | 249 | 61 |
| 4(h) | 3 | 30 | 404 | 167 | 176 | 72 |
| 4(i) | 1 | 30 | 253 | 55 | 210 | 46 |
| 4(j) | 3 | 10 | 179 | 73 | 88 | 36 |
| 4(k) | 1 | 10 | 177 | 95 | 52 | 28 |

Example 5

Preparation of Tripalmitin Emulsion:

In EXAMPLE 5(a), a 5% w/w of Tripalmitin (lipid) was dissolved in 20.0 g of chloroform. 5% w/w of phosphatidyl choline was used as a surfactant and was dissolved in chloroform. The Tripalmitin solution was then added to 180.0 g of water containing 0.25 g sodium glycocholate to form a mixture. The mixture was homogenized using a dispersator at 5000 rpm for 1 pass at 500 bar, and then 3 passes at 1300 bar using a commercially available Microfluidizer (model M110-L) to form EMULSION 5(a).

Production of Tripalmitin Particles:

Emulsion 5(a) was process in substantially the same manner as in previous EXAMPLES. The operating pressure was 80 bar, and the operating temperature was 35° C. The flow rate of carbon dioxide was 1 ml/min.

Figure 15:
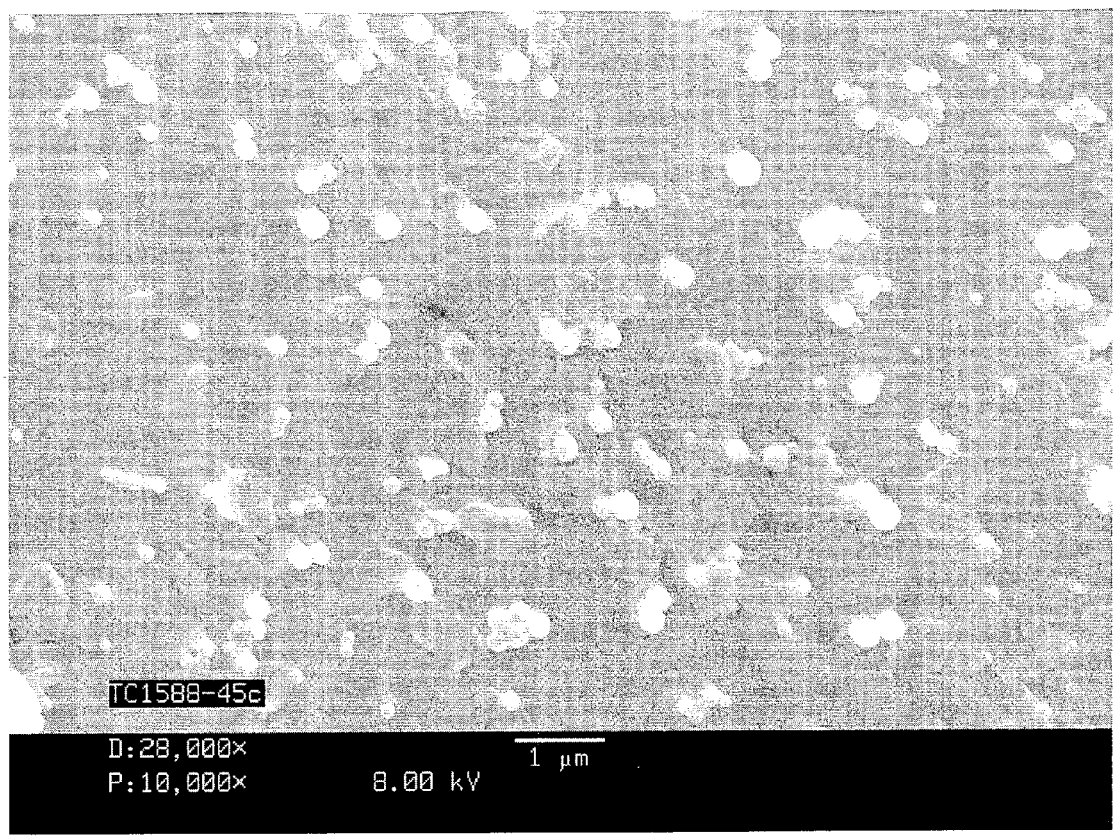
FIG. 15 is an SEM micrograph of CA nanoparticles produced in EXAMPLE 4(j)
Figure 16:
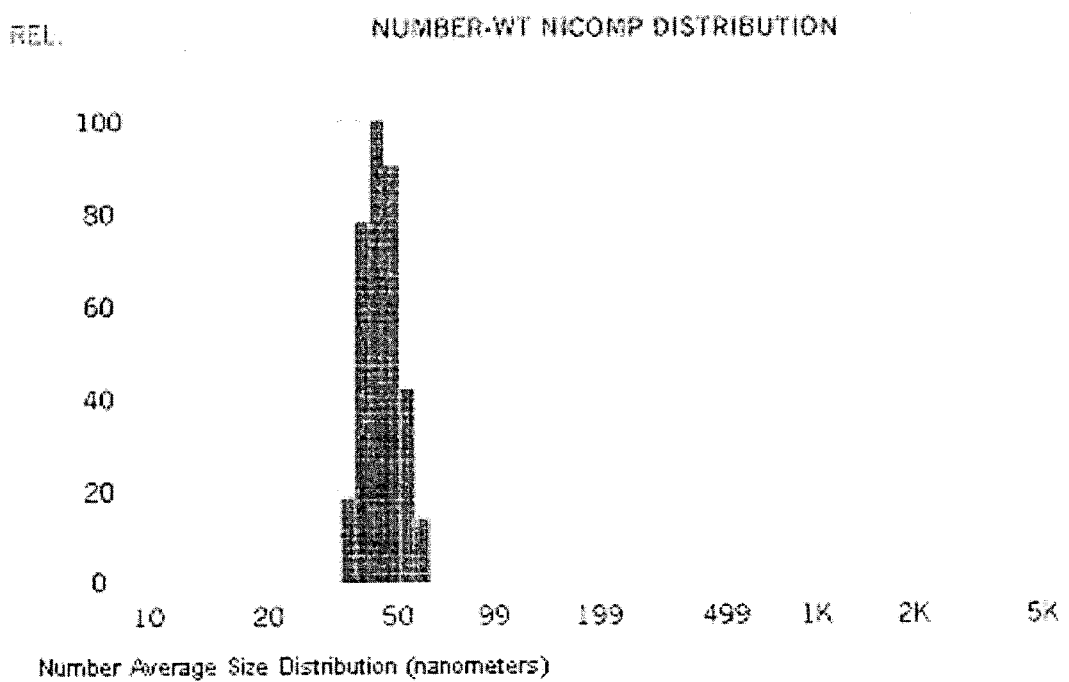
FIG. 16 is a number average size distribution graph of the Tripalmitin particles produced in EXAMPLE 5(a)
Figure 17:
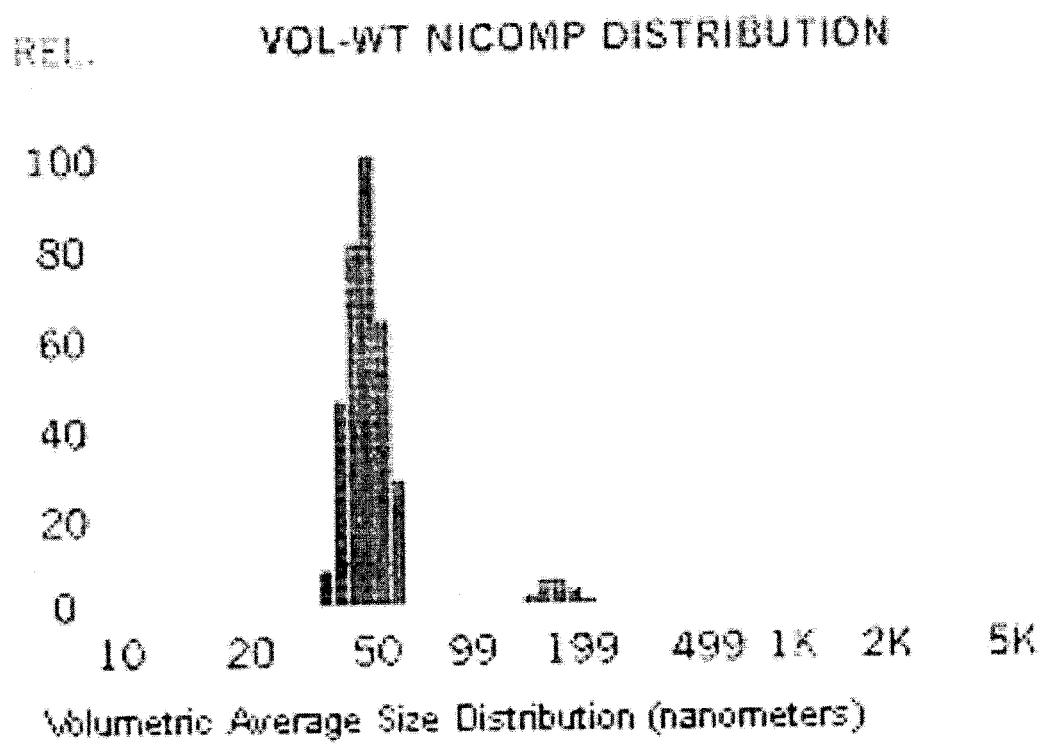
FIG. 17 is a volume average size distribution graph of the Tripalmitin particles produced in EXAMPLE 5(a).

Analysis of Tripalmitin Particles:

The Tripalmitin particles were produced, collected and analyzed in substantially the same manner as previous EXAMPLES. The results are listed in TABLE 10. FIG. 15 is an SEM micrograph of CA nanoparticles produced in EXAMPLE 5(a). FIG. 16 is a number average size distribution graph of the Tripalimite particles produced in EXAMPLE 5(a), and FIG. 17 is a volume average size distribution graph of the same particles. The FIGS. 16–17 show both number and volume average size distributions are in a range that is less than 50 nanometers.

TABLE 10

Results of Tripalmitin particle production.

| Ex. No. | Vol avg. (nm) | Std. Dev. (nm) | Number avg. (nm) | Std. Dev. (nm) |
|---------|---------------|----------------|------------------|----------------|
| 5(a)    | 39.6          | 31.5           | 20.4             | 16.3           |

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The scope of the invention thus includes other structures, systems and methods that do not differ from the literal language of the claims, and further includes other structures, systems and methods with insubstantial differences from the literal language of the claims.

What is claimed is:

1. A method of producing an aqueous suspension of particles, comprising:
    contacting an emulsion with a supercritical fluid, the emulsion having a continuous aqueous phase and a discontinous non-aqueous phase, the discontinuous non-aqueous phase comprising an organic solvent having a solute dissolved therein, the solute being generally insoluble in the continuous aqueous phase, and the organic solvent being soluble in the supercritical fluid; and
    extracting the organic solvent from the discontinous non-aqueous phase of the emulsion and into the supercritical fluid while the supercritical fluid is maintained as a supercritical phase to precipitate particles comprising the solute into the continuous aqueous phase and thereby form an aqueous suspension of particles.

2. The method as defined in claim 1 wherein the solute comprises a biologically active material or a drug.

3. The method as defined in claim 1 wherein the solute comprises a polymer.

4. The method as defined in claim 3 wherein the polymer is a biodegradable polymer.

5. The method as defined in claim 1 wherein wherein the emulsion and the supercritical fluid are separately fed into and contacted together in an extraction chamber, wherein the aqueous suspension of particles comprising the solute is removed from the extraction chamber at about the same rate as the emulsion is fed into the extraction chamber, and wherein supercritical fluid bearing the organic solvent extracted from the emulsion is removed from the extraction chamber at about the same rate as the supercritical fluid is fed into the extraction chamber.

6. The method as defined in claim 1 wherein the particles have an average diameter of from about 0.1 nanometers to about 1.0 millimeter.

7. The method as defined in claim 6 wherein the particles have an average diameter of from about 0.1 micrometers to about 400 micrometers.

8. The method as defined in claim 7 wherein the particles have an average diameter of from about 1 nanometer to about 500 nanometers.

9. The method as defined in claim 1 wherein the emulsion further comprises a surfactant.

10. The method as defined in claim 1 wherein the supercritical fluid comprises carbon dioxide.

11. The method as defined in claim 1 wherein the solute is selected from the group consisting of medicinal agents, nutritional materials, proteins, peptides, alkaloids, alkyloids, animal and/or plant extracts, antigens, nucleic acids, antibiotics, vitamins, lipids, polymers, polymer precursors, pigments, toxins, insecticides, viral materials, diagnostic aids, agricultural chemicals, dyes, explosives, paints, cosmetics, enzymes, and catalysts.

12. The method as defined in claim 1 wherein the particles are substantially spherical.

13. The method as defined in claim 1 further comprising the step of selecting a concentration of the solute in the organic solvent to obtain a desired particle size, wherein an increase in the solute concentration results in an increase in the particle size, and a decrease the solute concentration results in a decrease in the particle size.

14. The method as defined in claim 1 further comprising the step of selecting a concentration of the discontinuous non-aqueous phase in the continuous aqueous phase of the emulsion to obtain a desired particle size, wherein an increase in the concentration of the of the discontinuous non-aqueous phase in the emulsion results in an increase in the particle size, and a decrease the concentration of the of the discontinuous non-aqueous phase in the emulsion results in a decrease in the particle size.

15. The method as defined in claim 1 further comprising the step of injecting the emulsion into the supercritical fluid to form emulsion droplets, the droplets containing portions of the continuous aqueous phase and the discontinuous non-aqueous phase, wherein the particles are precipitated and suspended in the continuous aqueous phase in the droplets after the step of extracting the organic solvent from the discontinuous non-aqueous phase.

16. The method as defined in claim 15 further comprising the step of selecting a droplet size of the emulsion to obtain a desired particle size, wherein an increase in the droplet size results in an increase in the particle size, and a decrease the droplet size results in a decrease in the particle size.

17. The method as defined in claim 15 wherein the emulsion is injected through a nozzle such that the emulsion is sprayed into a volume of the supercritical fluid, and the nozzle is a capillary nozzle, a coaxial nozzle or an ultrasonic nozzle.

18. The method defined in claim 15 wherein the emulsion droplets are contacted with the supercritical fluid in a mixer to increase the contact area between the emulsion droplets and the supercritical fluid, the mixer being a vibrating surface or a propeller mixer that increases the mass transfer rate of the organic solvent from the emulsion droplets to the supercritical fluid.

19. The method as defined in claim 1 further comprising the steps of filtering the particles comprising the solute from the aqueous suspension to form a concentrated cake of particles, and freeze drying the cake to obtain dry particles.

20. The method as defined in claim 1 wherein the supercritical fluid is is selected from the group consisting of carbon dioxide, water, trifluoro methane, nitrous oxide, dimethylether, straight chain or branched C1–C6-alkane, alkene, alcohol, and combinations thereof.

* * * * *